(12) United States Patent
Lamoncha

(10) Patent No.: US 11,766,080 B2
(45) Date of Patent: Sep. 26, 2023

(54) FACE SHIELD FOR ATTACHMENT TO GOGGLES OR EYEGLASSES

(71) Applicant: Mark Lamoncha, Columbiana, OH (US)

(72) Inventor: Mark Lamoncha, Columbiana, OH (US)

(*) Notice: Subject to any disclaimer, the term of this patent is extended or adjusted under 35 U.S.C. 154(b) by 296 days.

(21) Appl. No.: 17/018,325

(22) Filed: Sep. 11, 2020

(65) Prior Publication Data

US 2021/0401088 A1 Dec. 30, 2021

Related U.S. Application Data

(60) Provisional application No. 63/044,731, filed on Jun. 26, 2020.

(51) Int. Cl.
| | |
|---|---|
| *A41D 13/11* | (2006.01) |
| *A62B 23/00* | (2006.01) |
| *A62B 23/02* | (2006.01) |
| *A62B 18/02* | (2006.01) |
| *A62B 18/08* | (2006.01) |
| *B33Y 10/00* | (2015.01) |
| *B33Y 50/00* | (2015.01) |
| *B33Y 80/00* | (2015.01) |
| *B33Y 70/10* | (2020.01) |

(52) U.S. Cl.
CPC .......... *A41D 13/1184* (2013.01); *A62B 18/02* (2013.01); *A62B 18/082* (2013.01); *A62B 23/00* (2013.01); *A62B 23/02* (2013.01); *B33Y 10/00* (2014.12); *B33Y 50/00* (2014.12); *B33Y 80/00* (2014.12); *B33Y 70/10* (2020.01)

(58) Field of Classification Search
CPC ....... A61F 9/02–068; A62B 7/00; A62B 7/10; A62B 9/04; A62B 17/00; A62B 17/006; A62B 18/02; A62B 23/00–025; A41D 13/11–1192; A61M 16/06–0655
See application file for complete search history.

(56) References Cited

U.S. PATENT DOCUMENTS

| | | | |
|---|---|---|---|
| 2,388,626 | A | 11/1945 | Wilson |
| 2,393,955 | A | 2/1946 | Baratelli et al. |
| 2,574,749 | A | 11/1951 | Mendelsohn |
| 2,774,970 | A | 12/1956 | Du Bois |

(Continued)

FOREIGN PATENT DOCUMENTS

DE 202020102697 U1 7/2020

OTHER PUBLICATIONS

ChicMe, Face Mask with Clear Window Visible Expression for the Deaf and Hard of Hearing, site visited Aug. 19, 2020, https://www.chicme.com/product/face_mask_with_clear_window_visible_expression_for_the_deaf_and_hard_of_hearing/7a76007a-3d75-4f4f-b443-f2a8cb6d0db0.html.

(Continued)

*Primary Examiner* — Rachel T Sippel
(74) *Attorney, Agent, or Firm* — Standley Law Group LLP; Jeffrey S. Standley; Adam J. Smith

(57) ABSTRACT

Systems and methods for a face shield for attachment to goggles or eyeglasses are disclosed. An attachment portion secures a shield to said goggles or eyeglasses. The attachment portion includes an outer band secured to and extending along an upper portion of the shield. An inner band extends along an upper portion of the goggles or eyeglasses. At least one clip removably secures the attachment portion to the goggles or eyeglasses.

13 Claims, 26 Drawing Sheets

(56) References Cited

U.S. PATENT DOCUMENTS

| | | |
|---|---|---|
| 3,298,031 A | 1/1967 | Morgan |
| 3,531,188 A | 9/1970 | LeBlanc et al. |
| 3,991,753 A | 11/1976 | Viesca y Viesca |
| 4,231,364 A | 11/1980 | Speshyock |
| 4,280,491 A | 7/1981 | Berg et al. |
| 4,764,167 A | 8/1988 | Tu |
| 4,790,306 A | 12/1988 | Braun et al. |
| 4,796,621 A | 1/1989 | Barle et al. |
| 4,821,340 A | 4/1989 | Johnson |
| 4,832,018 A | 5/1989 | Pantaleon-Stemberg |
| 4,843,643 A | 7/1989 | Parissenti |
| 4,850,346 A | 7/1989 | Michel et al. |
| 4,924,526 A | 5/1990 | Parissenti et al. |
| 4,934,361 A | 6/1990 | Michel et al. |
| 4,965,887 A | 10/1990 | Paoluccio et al. |
| 5,062,421 A | 11/1991 | Burns et al. |
| 5,086,768 A | 2/1992 | Niemeyer |
| 5,167,036 A | 12/1992 | Daprato |
| 5,181,507 A | 1/1993 | Michel et al. |
| 5,206,956 A | 5/1993 | Olson |
| 5,240,478 A | 8/1993 | Messina |
| 5,247,706 A * | 9/1993 | Mark ............... A61F 9/025 2/427 |
| 5,265,595 A | 11/1993 | Rudolph |
| H1316 H | 6/1994 | McGuinness |
| 5,331,957 A | 7/1994 | Liui |
| 5,392,773 A | 2/1995 | Bertrand |
| 5,416,923 A | 5/1995 | Peugh |
| 5,463,693 A | 10/1995 | Birli et al. |
| 5,471,679 A | 12/1995 | Paoluccio |
| 5,505,197 A | 4/1996 | Scholey |
| 5,765,223 A | 6/1998 | McCausland |
| 5,957,131 A | 9/1999 | Hutchinson et al. |
| 5,996,580 A | 12/1999 | Swann |
| 6,016,808 A * | 1/2000 | Landis ............... A61F 9/045 2/9 |
| 6,298,849 B1 | 10/2001 | Scholey et al. |
| 6,408,845 B1 | 6/2002 | Pereira et al. |
| 6,497,232 B2 | 12/2002 | Fecteau et al. |
| 6,497,756 B1 | 12/2002 | Curado et al. |
| 6,536,435 B1 | 3/2003 | Fecteau et al. |
| 6,543,450 B1 | 4/2003 | Flynn |
| 6,584,975 B1 | 7/2003 | Taylor |
| 6,604,524 B1 | 8/2003 | Curran et al. |
| 6,684,882 B1 | 2/2004 | Morine |
| 6,758,212 B2 | 7/2004 | Swann |
| 6,763,835 B1 | 7/2004 | Grove et al. |
| 6,957,653 B2 | 10/2005 | Campbell et al. |
| 6,959,709 B2 | 11/2005 | Curran et al. |
| 7,007,695 B2 | 3/2006 | Curran et al. |
| 7,082,944 B2 | 8/2006 | Gossweiler |
| 7,188,623 B2 | 3/2007 | Anderson et al. |
| 7,294,175 B2 | 11/2007 | Huang et al. |
| 7,594,278 B2 | 9/2009 | Huh |
| 7,878,202 B2 | 2/2011 | Anderson et al. |
| 8,192,523 B1 | 6/2012 | Kaufman et al. |
| 8,211,226 B2 | 7/2012 | Bredt et al. |
| 8,291,512 B2 * | 10/2012 | Stoll ............... A41D 13/1184 2/418 |
| 9,084,416 B2 | 7/2015 | Steen et al. |
| 9,192,793 B2 | 11/2015 | Patil et al. |
| 9,192,796 B2 | 11/2015 | Patil et al. |
| 9,408,424 B2 | 8/2016 | Noh et al. |
| 9,468,782 B2 | 10/2016 | Koehler |
| 9,596,842 B2 | 3/2017 | Steen et al. |
| 10,207,129 B2 | 2/2019 | Koehler |
| 10,213,629 B2 | 2/2019 | Tobias |
| 10,556,136 B2 | 2/2020 | Seppala et al. |
| 10,881,157 B1 | 1/2021 | Anderson |
| 11,533,958 B1 * | 12/2022 | Spinnato ............ A41D 13/1184 |
| 11,559,652 B2 * | 1/2023 | Oddo ............... G02C 5/001 |
| 2002/0078953 A1 | 6/2002 | Fecteau et al. |
| 2004/0007234 A1 | 1/2004 | Duxbury |
| 2004/0025878 A1 | 2/2004 | Duxbury |
| 2004/0237962 A1 | 12/2004 | Russell |
| 2005/0051169 A1 | 3/2005 | Gossweiler |
| 2005/0150385 A1 | 7/2005 | Huang et al. |
| 2006/0005841 A1 | 1/2006 | Anderson et al. |
| 2006/0081249 A1 | 4/2006 | Duxbury |
| 2006/0201513 A1 | 9/2006 | Chu |
| 2006/0207605 A1 | 9/2006 | Anderson et al. |
| 2007/0240719 A1 | 10/2007 | Duarte |
| 2008/0223370 A1 | 9/2008 | Kim |
| 2010/0065058 A1 | 3/2010 | Ungar et al. |
| 2012/0184024 A1 | 7/2012 | Steen et al. |
| 2014/0116430 A1 | 5/2014 | Patil et al. |
| 2014/0283842 A1 | 9/2014 | Bearne et al. |
| 2015/0020800 A1 | 1/2015 | Tobias |
| 2015/0053206 A1 | 2/2015 | Seppala et al. |
| 2015/0342178 A1 | 12/2015 | Steen et al. |
| 2016/0001101 A1 | 1/2016 | Sabolis et al. |
| 2016/0213959 A1 | 7/2016 | Barklow |
| 2016/0332008 A1 | 11/2016 | McAndrews |
| 2017/0273626 A1 | 9/2017 | MacDonald |
| 2017/0361531 A1 | 12/2017 | Hasskerl et al. |
| 2019/0126542 A1 | 5/2019 | Poppe et al. |
| 2019/0127598 A1 | 5/2019 | Bernhardt et al. |
| 2019/0255370 A1 | 8/2019 | Seppala et al. |
| 2019/0299520 A1 | 10/2019 | Wieber et al. |
| 2019/0321663 A1 | 10/2019 | Nestelroad et al. |
| 2020/0108218 A1 | 4/2020 | Bock-Aronson et al. |
| 2021/0275842 A1 | 9/2021 | Conrad |
| 2021/0319777 A1 | 10/2021 | Wang |
| 2021/0345703 A1 * | 11/2021 | Sheldon ............ A41D 13/1184 |
| 2021/0392973 A1 * | 12/2021 | Whitehead ......... A41D 13/1184 |
| 2022/0258236 A1 * | 8/2022 | Andrews ............ B29C 64/35 |

OTHER PUBLICATIONS

ClearMask, The ClearMask, site visited Aug. 19, 2020, https://www.theclearmask.com/product.

Etsy, site visited Aug. 19, 2020, https://www.etsy.com/market/clear_mask.

FilterSpec, Filterspec PRO Goggle FFP3V Valved, site visited Aug. 19, 2020, https://www.jspsafety.com/link/en/respiratory-protection/filterspec-integrated-protection/filterspec-pro/filterspec-pro-goggle-ffp3v-valved/age130-201-100/p/?parm=CAT1JSP&prdcod=AGE130-201-100.

Good Housekeeping, Where to Buy Clear Face Masks with Windows for Lip Reading, site visited Aug. 19, 2020, https://www.goodhousekeeping.com/health/g33471599/best-clear-face-masks/.

Jackson Safety, Jackson Safety 18629 V90 Goggle and Faceshield, Standard, Clear with Blue Tint, site visited Aug. 19, 2020, https://www.amazon.com/Jackson-Safety-18629-Faceshield-Standard/dp/B00KTEM046.

Unique Gadgets & Toys, Safety Face Shield Reusable Goggle Shield Wearing Glasses Face Visor Transparent Anti-Fog Layer Protect Eyes from Splash, site visited Aug. 19, 2020, https://www.amazon.com/Reusable-Wearing-Glasses-Transparent-Anti-Fog/dp/B087F2CNKH/ref=sr_1_6?dchild=1&keywords=Unique+Gadgets+%26+Toys&qid=1603913032&sr=8-6.

Additive Manufacturing, 3D Printing and Coronavirus: U.S. Additive Manufacturers Share Their Experiences, May 19, 2020, https://www.additivemanufacturing.media/blog/post/3d-printing-and-coronavirus-us-additive-manufacturers-share-their-experiences.

* cited by examiner ively heavy weight of a shield on a small band about the user's head. Other PPE may be designed to fit an average person, but may not be well suited to the individual. Certain manufacturing techniques, such as but not limited to 3D printing, may provide for greater flexibility in PPE design that can be better suited to the individual and/or may allow for more ergonomic designs. What is needed is a face shield for attachment to goggles or eyeglasses.

FACE SHIELD FOR ATTACHMENT TO GOGGLES OR EYEGLASSES

CROSS-REFERENCE TO RELATED APPLICATIONS

This application claims the benefit of U.S. Provisional Application Ser. No. 63/044,731 filed Jun. 26, 2020, the disclosures of which are hereby incorporated by reference as if fully restated herein.

TECHNICAL FIELD

Exemplary embodiments relate generally to a face shield for attachment to googles or eyeglasses.

BACKGROUND AND SUMMARY OF THE INVENTION

The global COVID-19 pandemic has emphasized that wearing certain personal protective equipment ("PPE") repeatedly or for extended periods of time may be uncomfortable. For example, face shields may rest the relatively heavy weight of a shield on a small band about the user's head. Other PPE may be designed to fit an average person, but may not be well suited to the individual. Certain manufacturing techniques, such as but not limited to 3D printing, may provide for greater flexibility in PPE design that can be better suited to the individual and/or may allow for more ergonomic designs. What is needed is a face shield for attachment to goggles or eyeglasses.

Face shields for attachment to goggles or eyeglasses are provided. An attachment portion may be configured to facilitate attachment of a shield to the eyeglasses or goggles. The attachment portion may comprise an outer band and an inner band, one or more of which may be arcuate shaped. The outer and inner bands may be spaced apart from one another except where they intersect at opposing ends thereof. The outer band may be shaped to match a curvature of the shield. The inner band may be shaped to match a curvature of the eyeglasses or goggles and/or the user's forehead. Clips may be provided which facilitate attachment of the eyeglasses or goggles to the shield, by way of the attachment portion. The clips may be provided where the outer and inner bands intersect. A reinforcement member may extend between one or more portions of said inner and outer bands. At least the central portion of the outer band may be connected to the shield.

In exemplary embodiments, the shield may comprise a breathing filter. The breathing filter may be attached to, or integrally formed with, the eyeglasses or goggles. For example, without limitation, the breathing filter may be attached to, or integrally formed with, a bridge portion of the eyeglasses or goggles. The breathing filter may be configured to cover the user's nose and/or mouth when the shield is worn. In exemplary embodiments, the breathing filter may be pear shaped. The breathing filter may be comprised of any material configured to filter any size or shape particulate.

The shield and/or at least some of the attachment portion may be formed by 3D printing. The shield may comprise sand particles in a density configured to provide a predetermined level of transparency while maintaining a predetermined level of rigidity to the shield.

3D scanning may be utilized to scan goggles or eyeglasses and/or a user's face. Shields covering desired portions of a user's face or other body part may be generated. Attachment portions connecting the shields to the goggles or eyeglasses may be generated. A breathing filter may be 3D scanned, provided, and/or generated. Additional attachment portions may be generated for connecting the breathing filter to the goggles or eyeglasses. The various components may be gathered and/or 3D printed and assembled to create the face shield. Certain portions of the face shields, such as but not limited to the attachment portions and/or the shield, may be said resin infiltrated. Though discussed with regards to goggles or eyeglasses, these disclosures may be utilized with other items of PPE to cover various portions of the user's body. These disclosures may permit the generation of various attachment portions for securing various sizes, shapes, and types of shields to various sizes, shapes, and types of PPE without the need for tooling.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
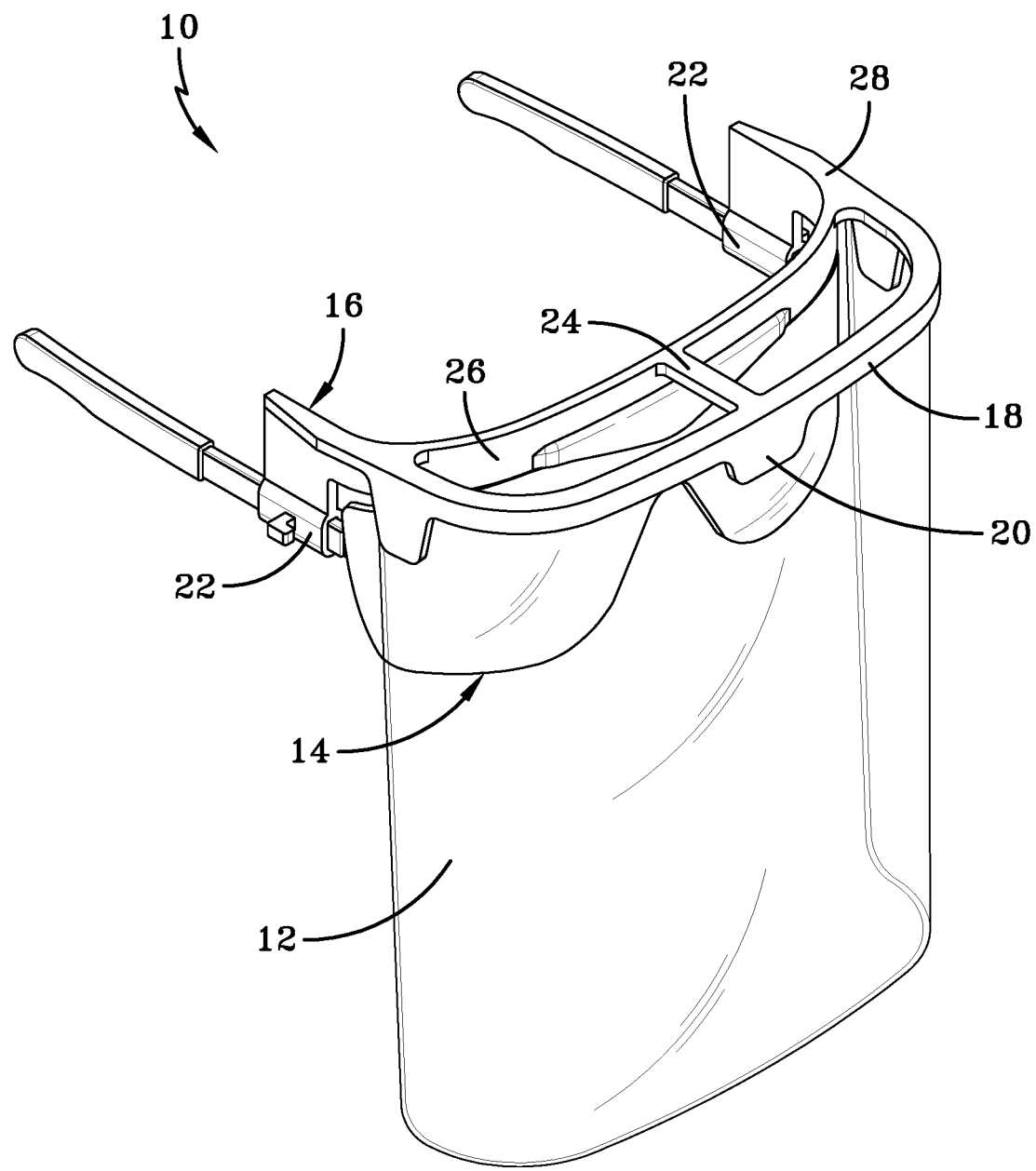
FIG. 1 is a front perspective view of an exemplary face shield in accordance with the present invention.
Figure 2:
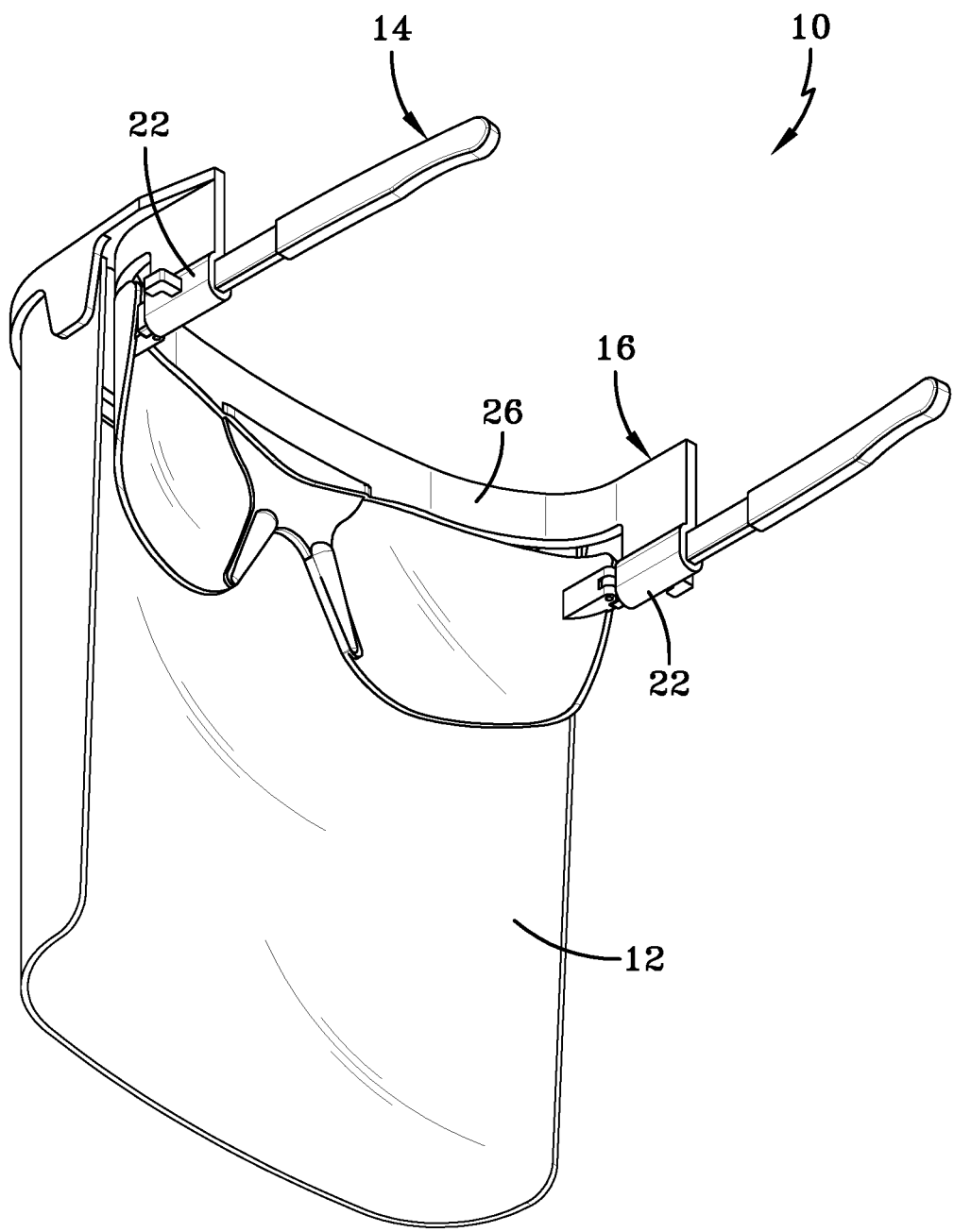
FIG. 2 is a rear perspective view of the face shield of FIG. 1.
Figure 3:
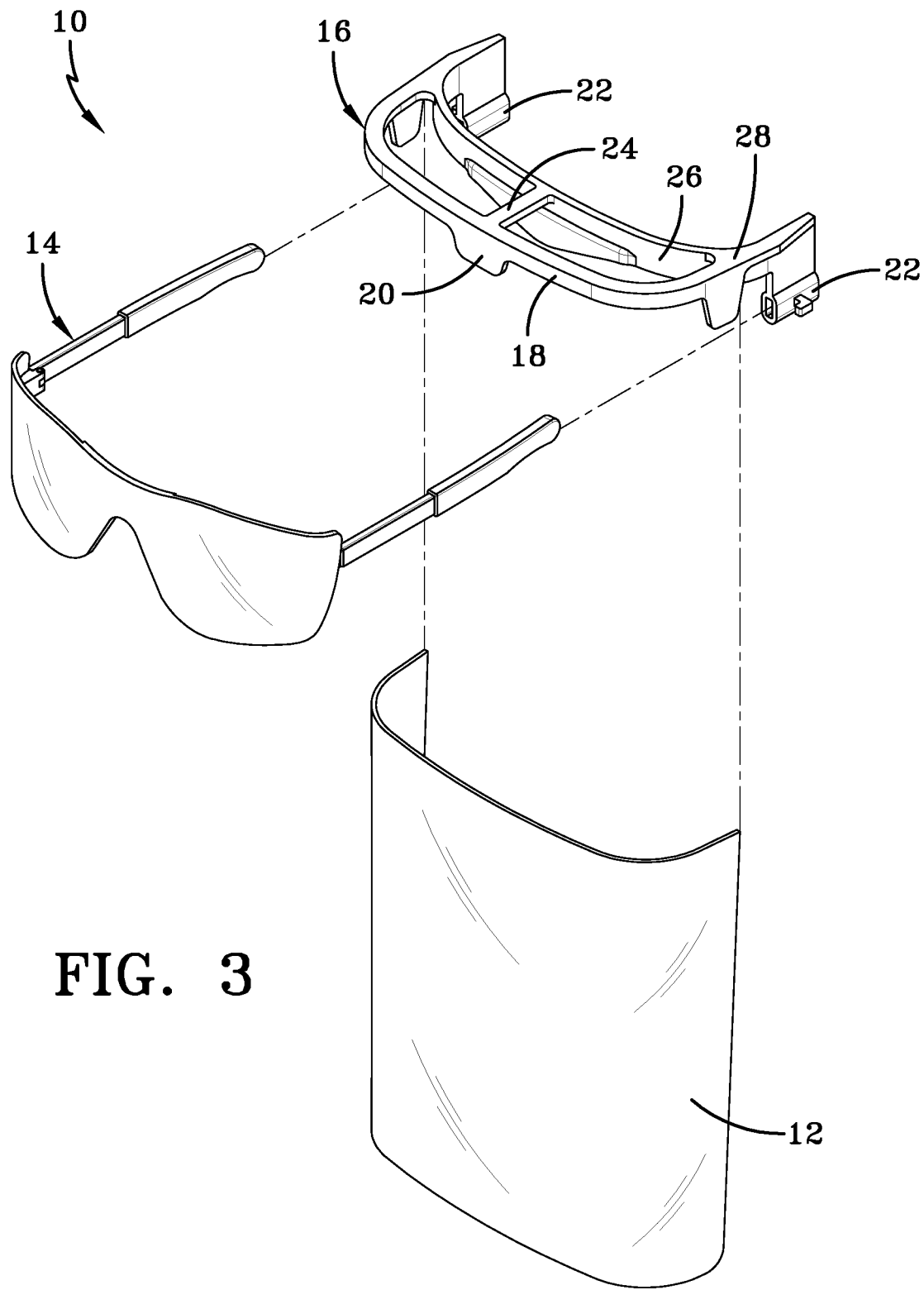
FIG. 3 is an exploded view of the face shield of FIG. 1.
Figure 4:
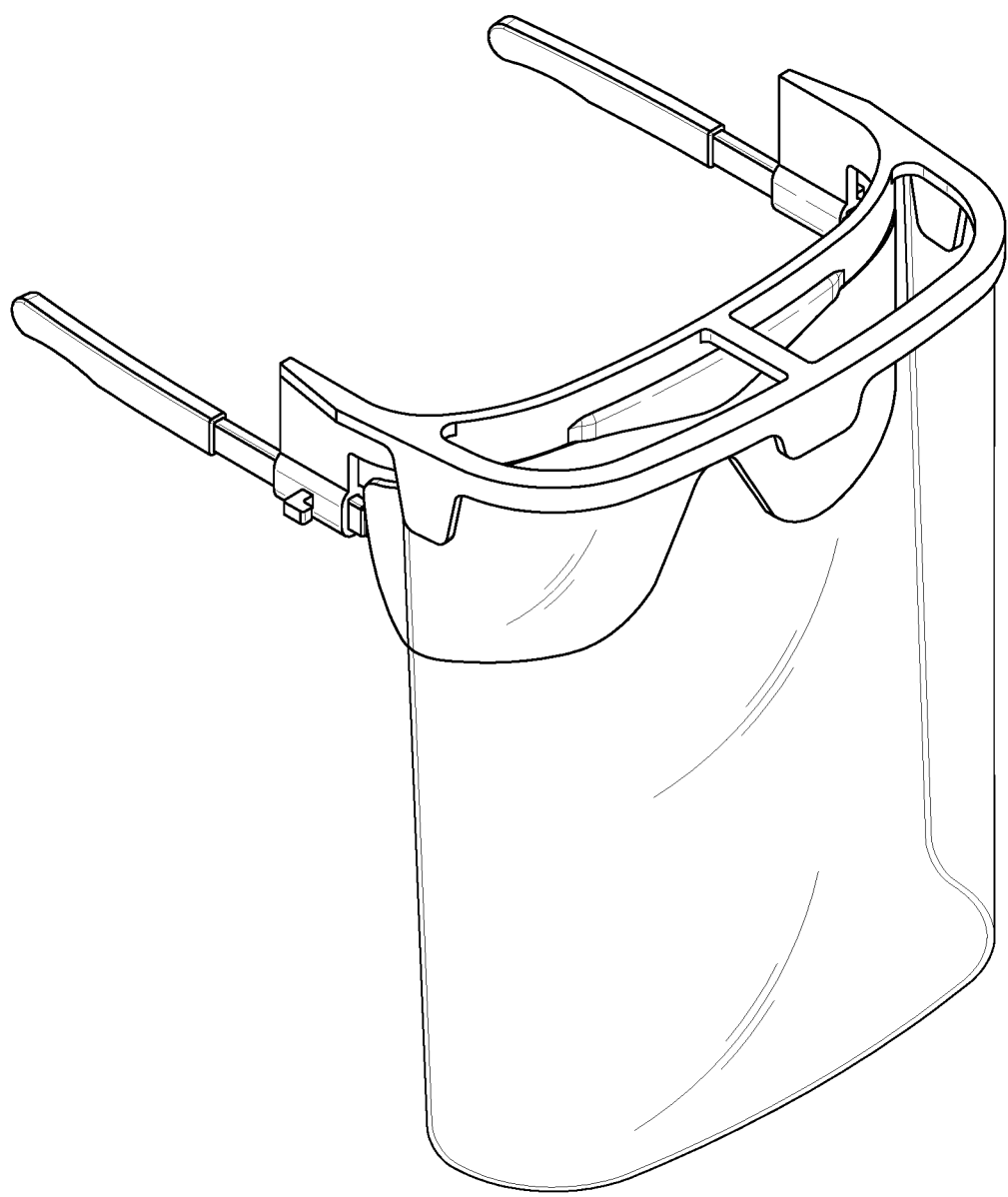
FIG. 4 is a front perspective view of the face shield of FIG. 1.
Figure 5:
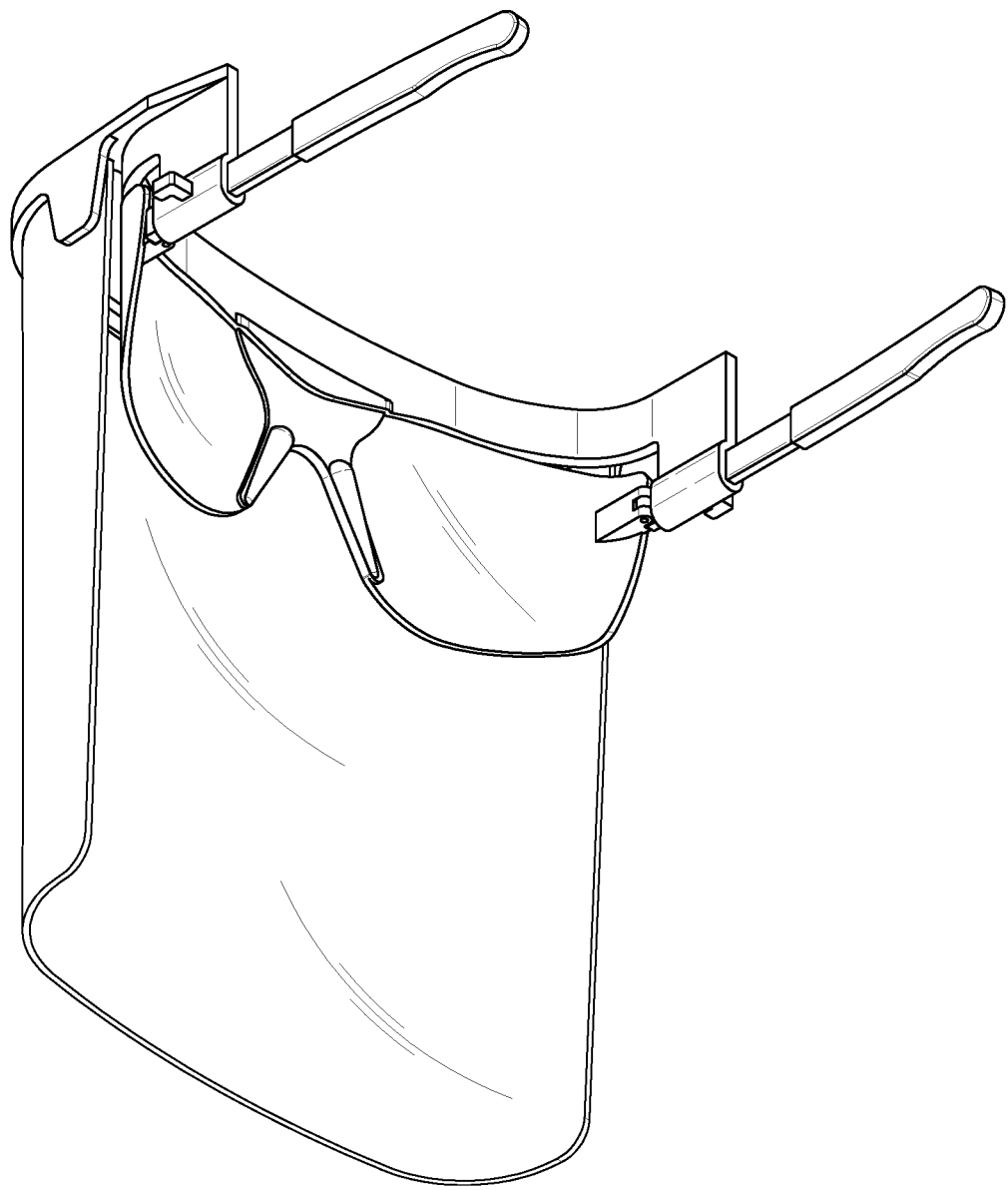
FIG. 5 is a rear perspective view of the face shield of FIG. 1.
Figure 6:
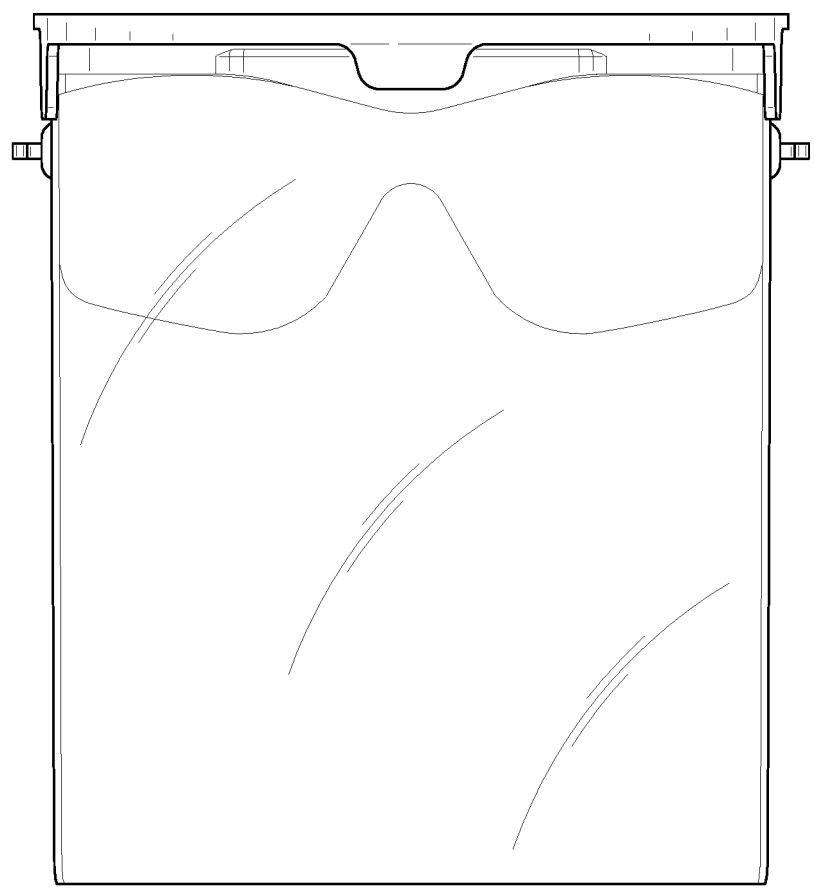
FIG. 6 is a front view of the face shield of FIG. 1.
Figure 7:
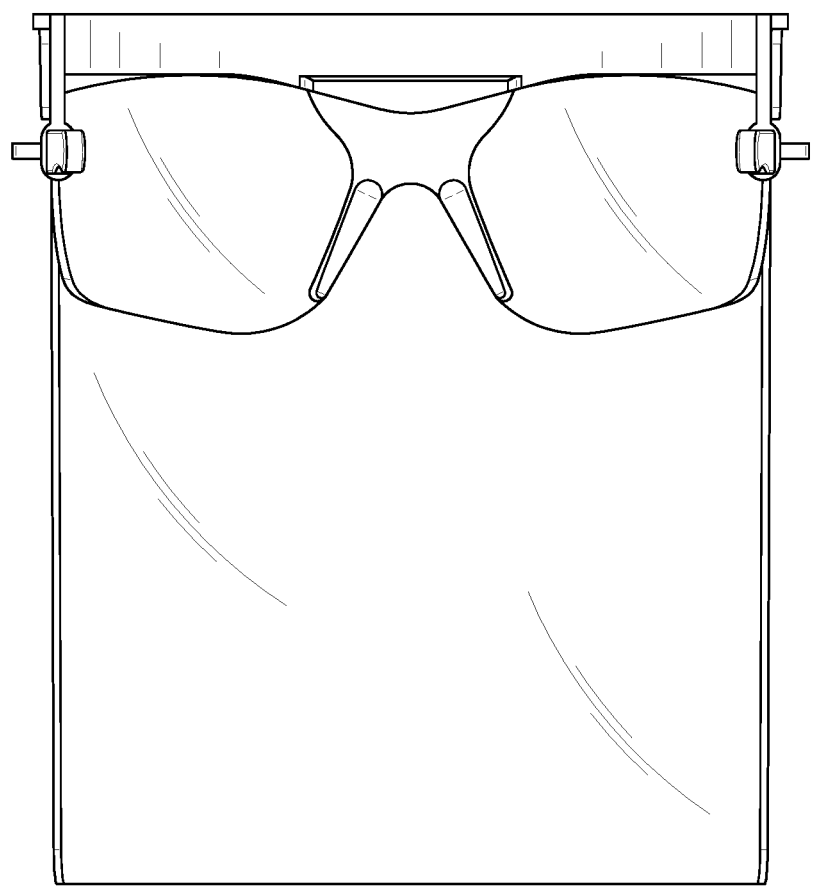
FIG. 7 is a rear view of the face shield of FIG. 1.
Figure 8:
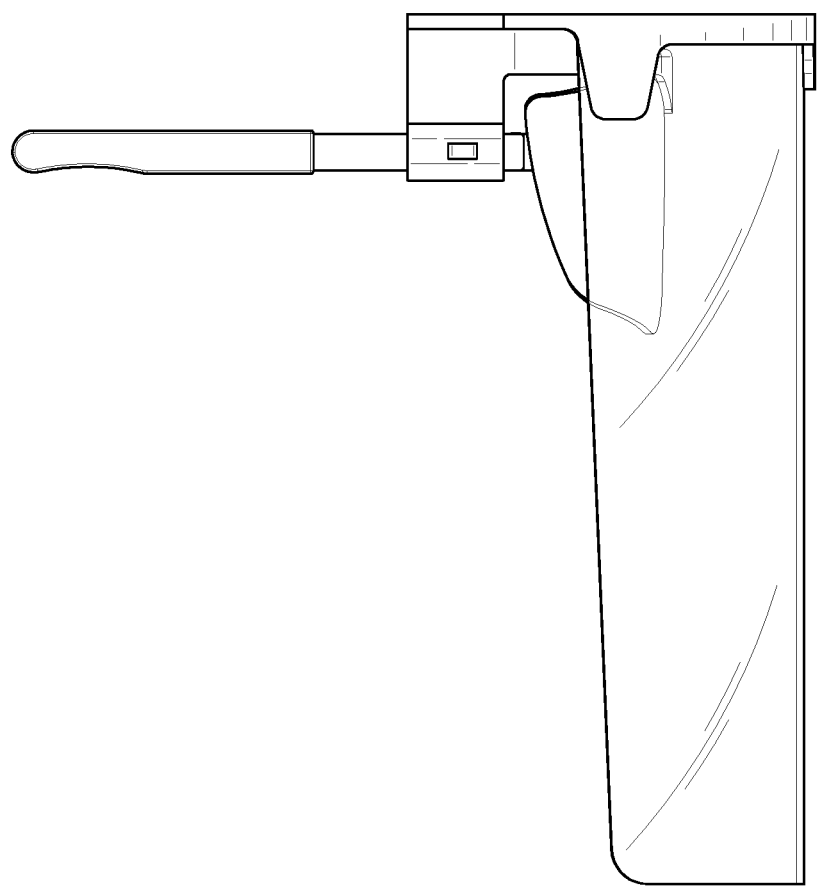
FIG. 8 is a left-side view of the face shield of FIG. 1.
Figure 9:
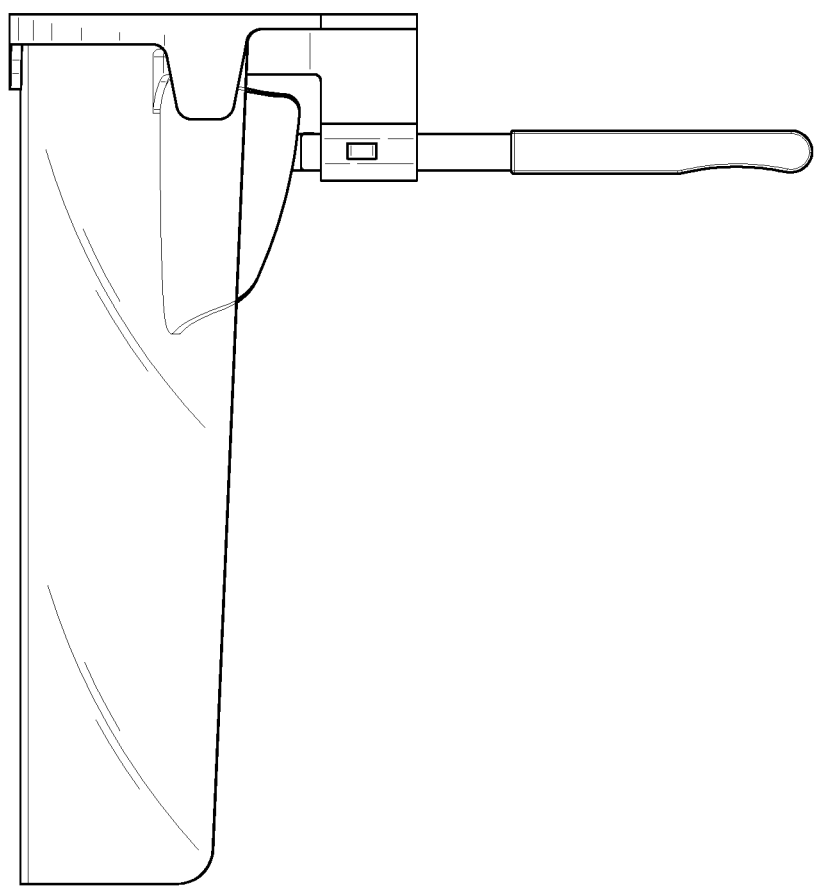
FIG. 9 is a right-side view of the face shield of FIG. 1.
Figure 10:
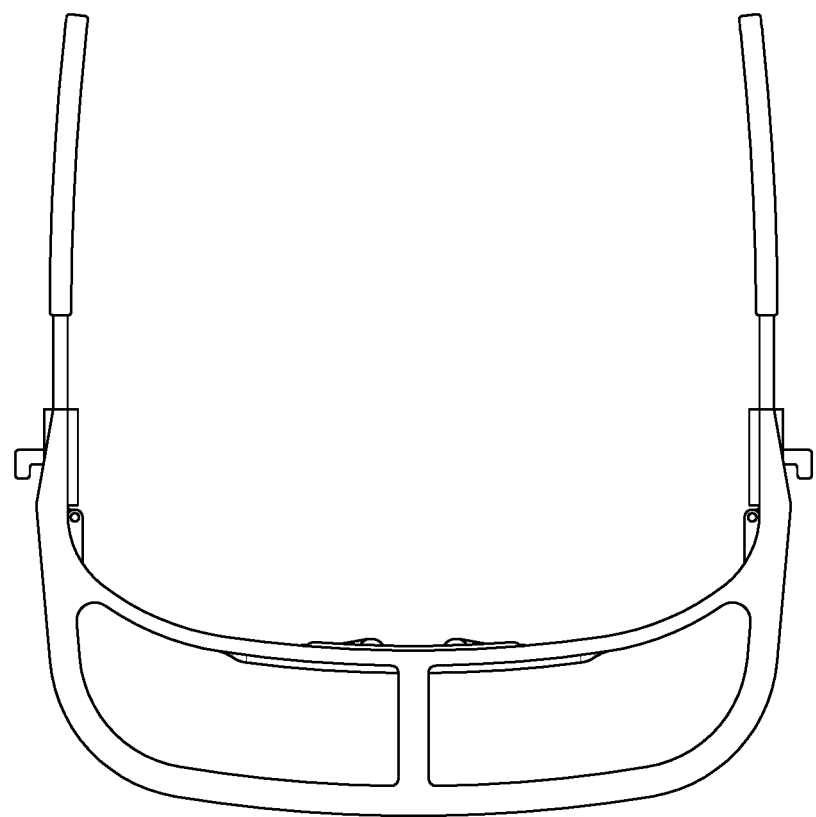
FIG. 10 is a top view of the face shield of FIG. 1.
Figure 11:
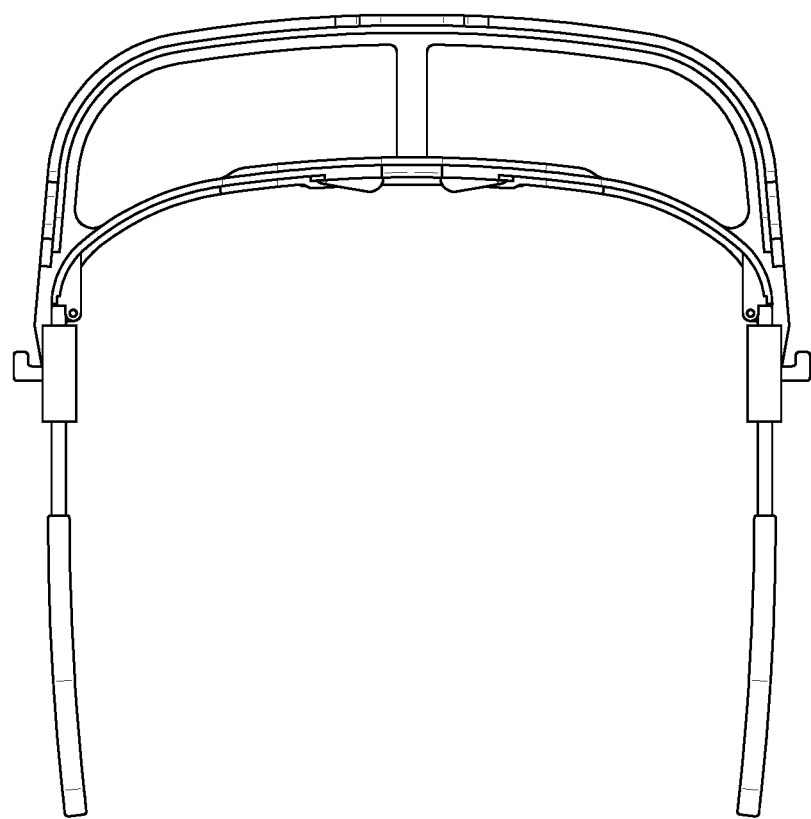
FIG. 11 is a bottom view of the face shield of FIG. 1.
Figure 12:
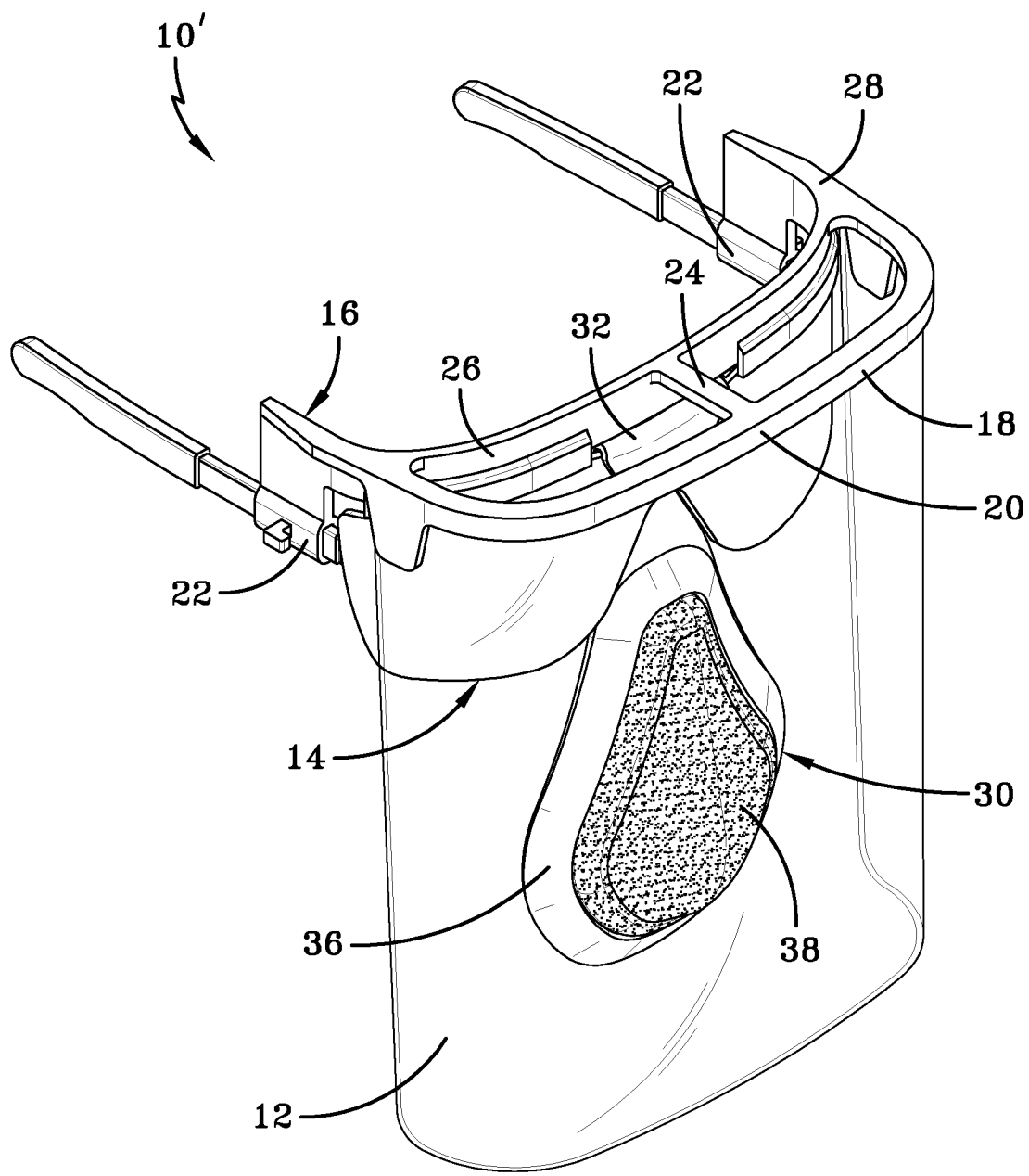
FIG. 12 is a front perspective view of an exemplary face shield with integrated breathing filter in accordance with the present invention.
Figure 13:
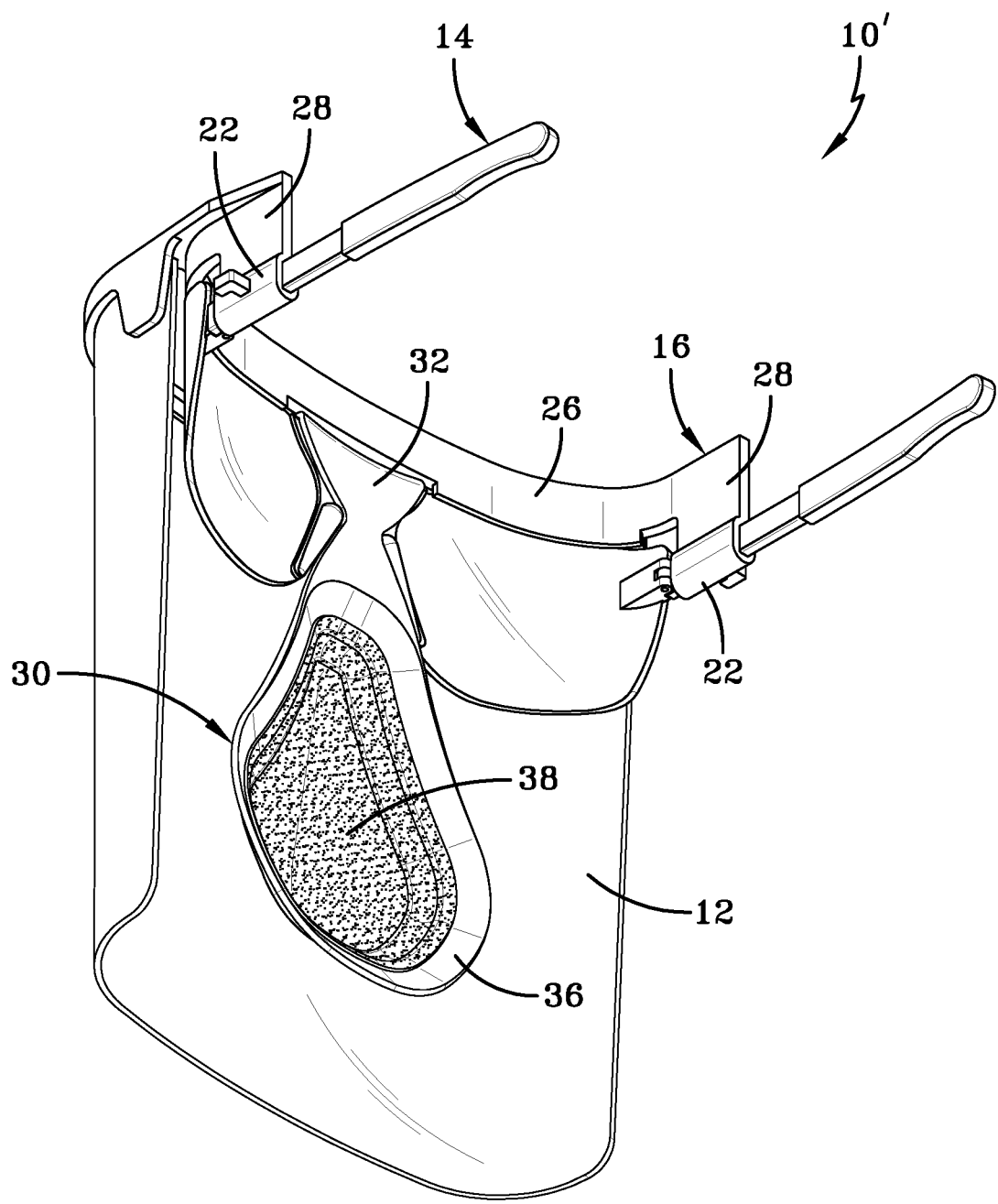
FIG. 13 is a rear perspective view of the face shield and breathing filter of FIG. 12.
Figure 14:
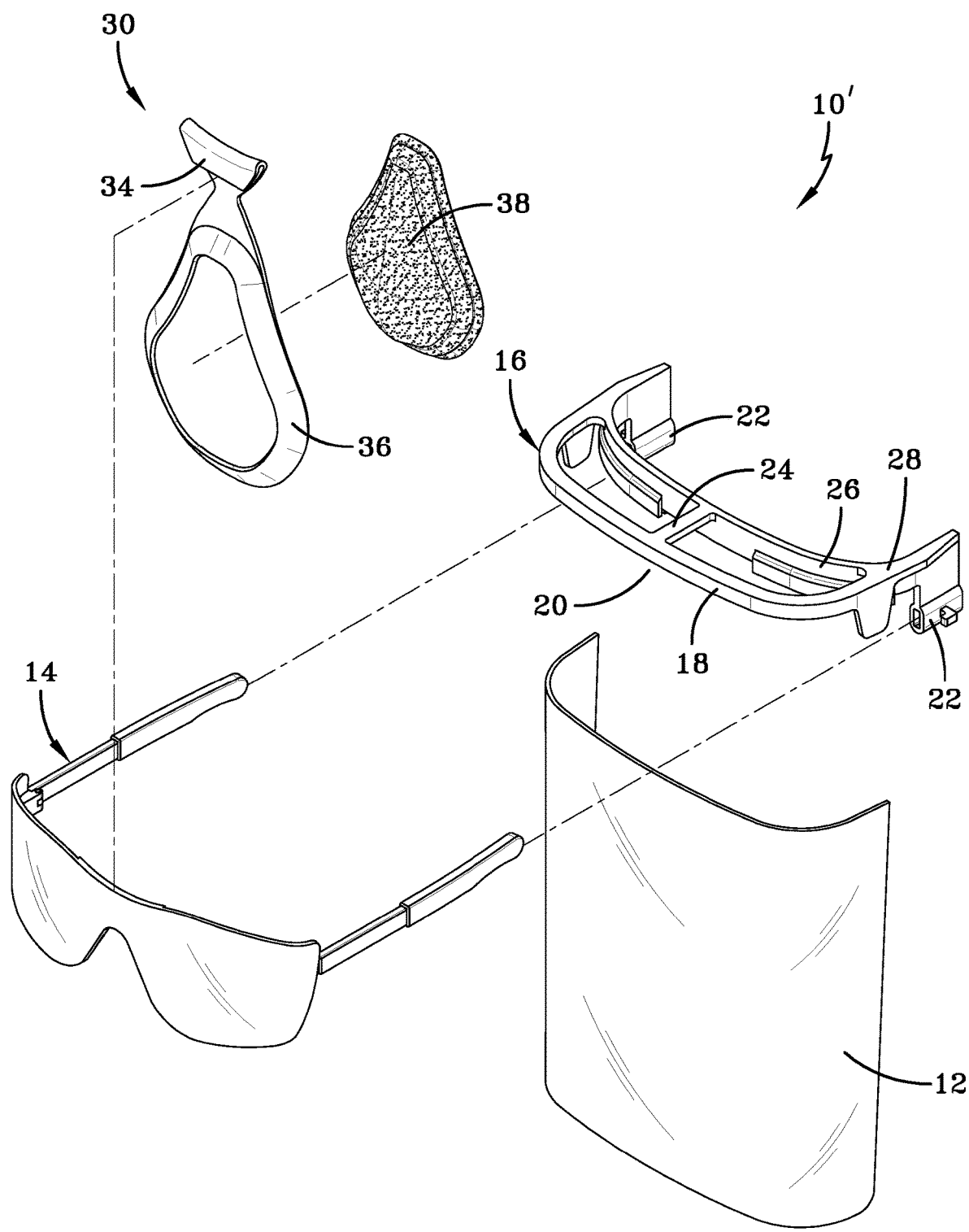
FIG. 14 is an exploded view of the face shield and breathing filter of FIG. 12.
Figure 15:
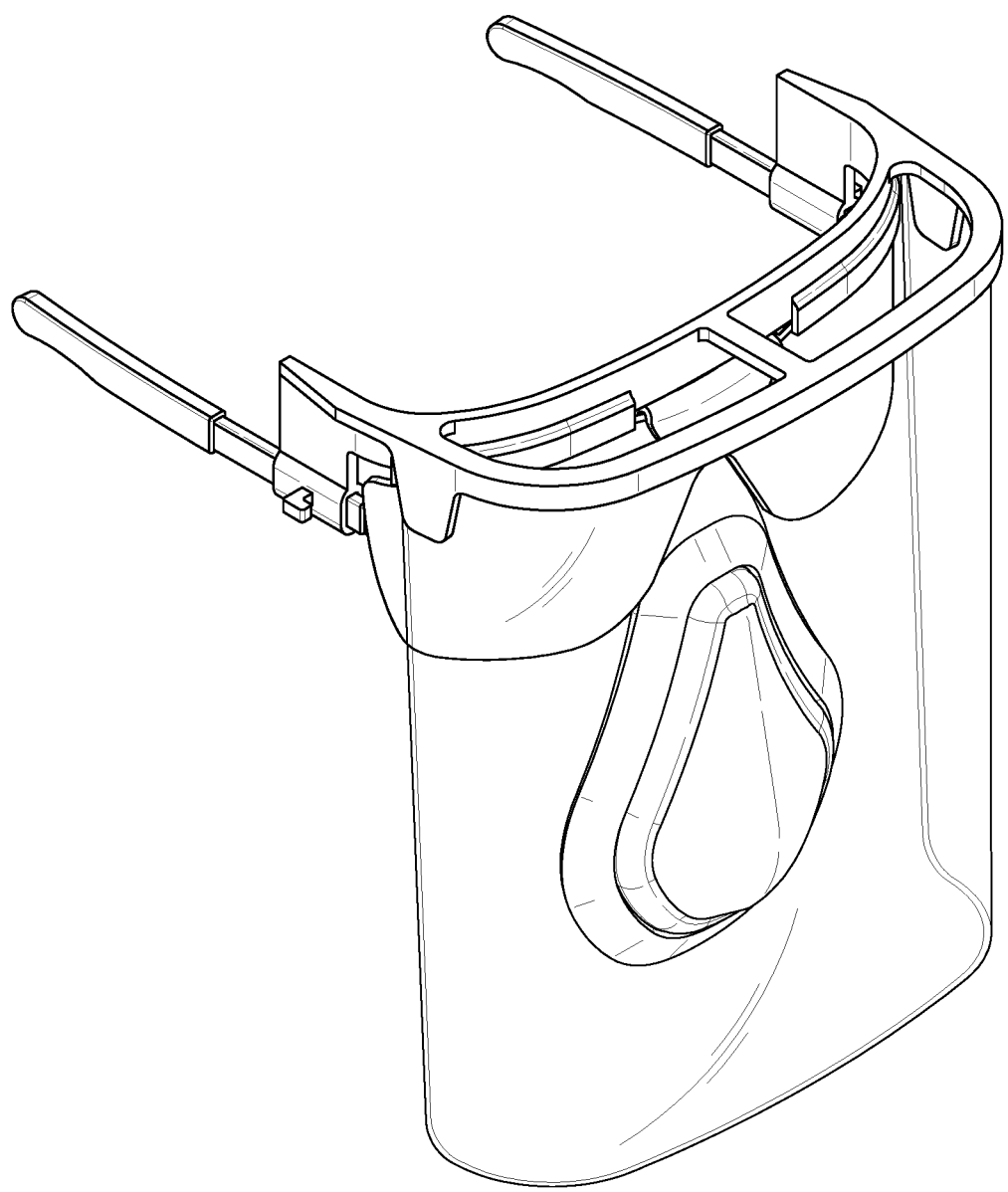
FIG. 15 is a front perspective view of the face shield and breathing filter of FIG. 12.
Figure 16:
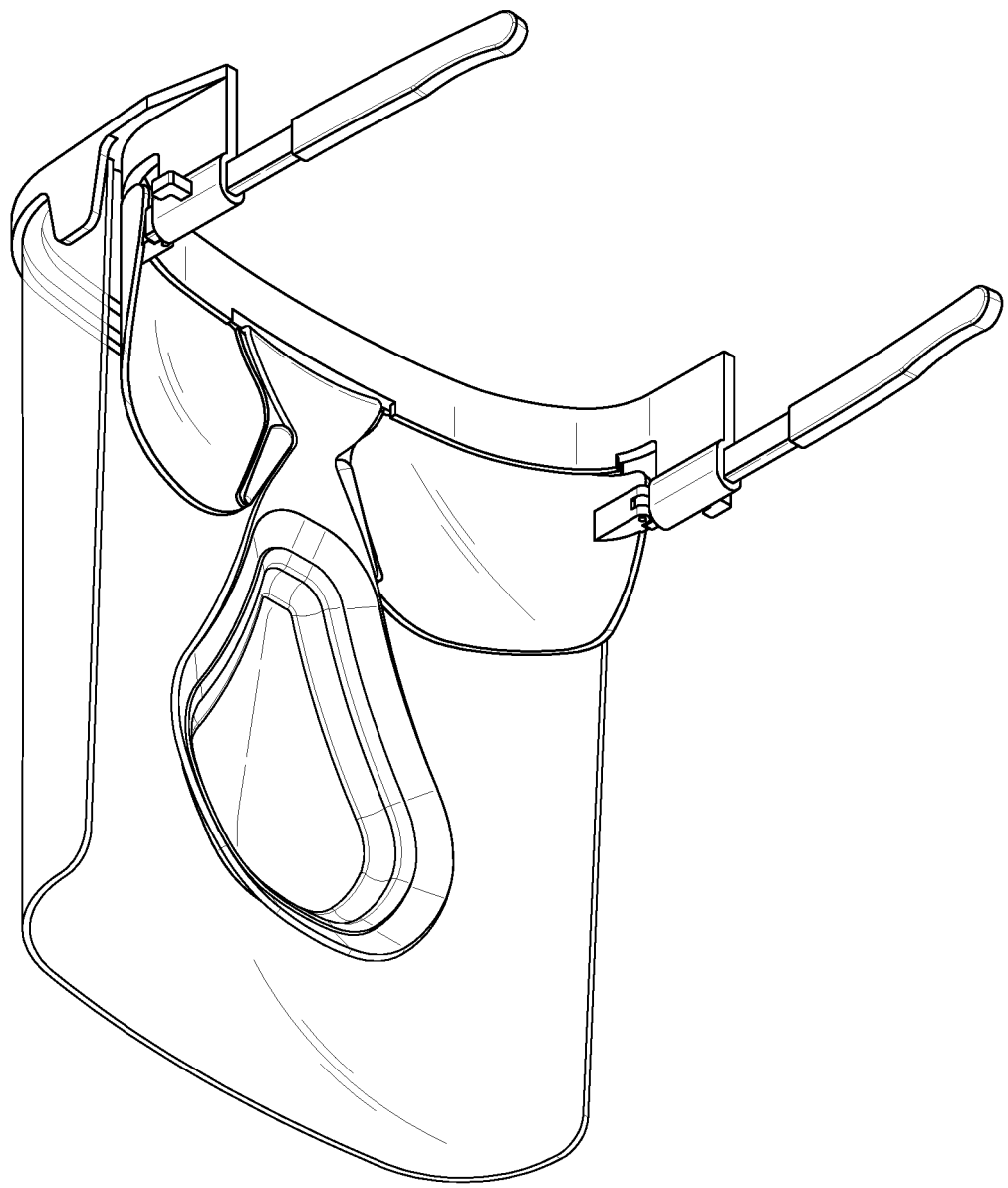
FIG. 16 is a rear perspective view of the face shield and breathing filter of FIG. 12.
Figure 17:
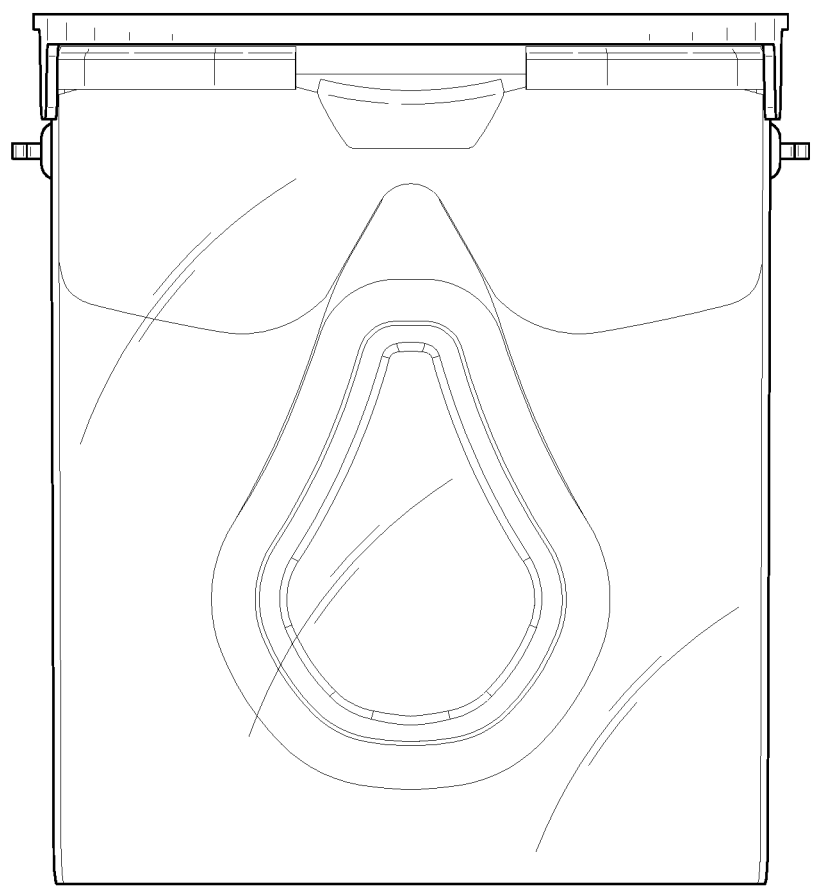
FIG. 17 is a front view of the face shield and breathing filter of FIG. 12.
Figure 18:
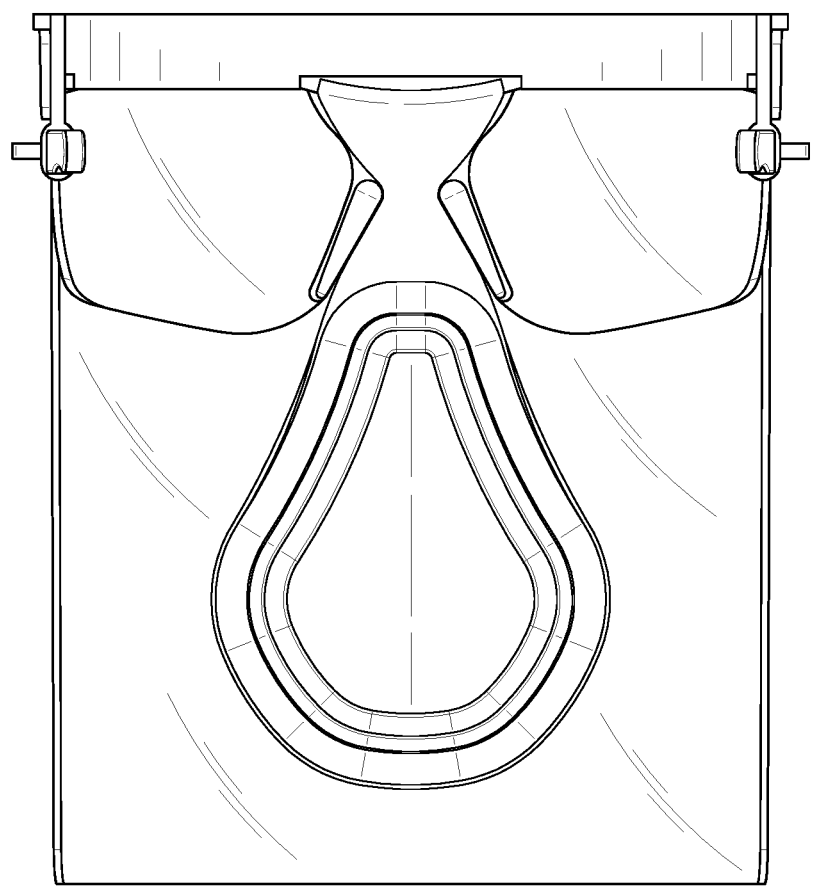
FIG. 18 is a rear view of the face shield and breathing filter of FIG. 12.
Figure 19:
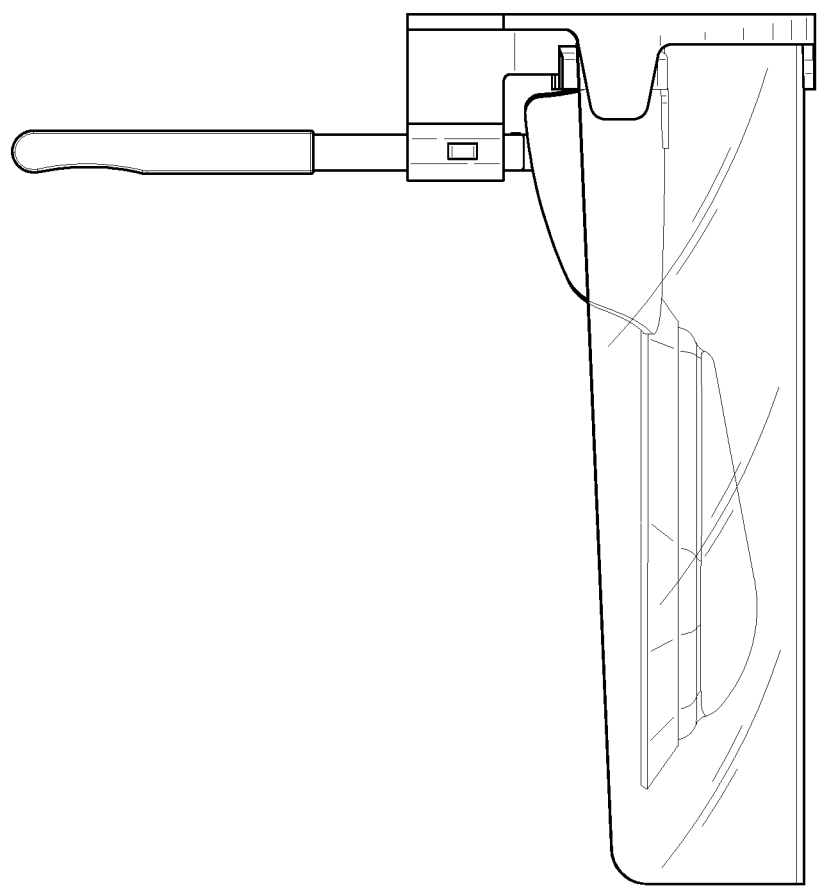
FIG. 19 is a left-side view of the face shield and breathing filter of FIG. 12.
Figure 20:
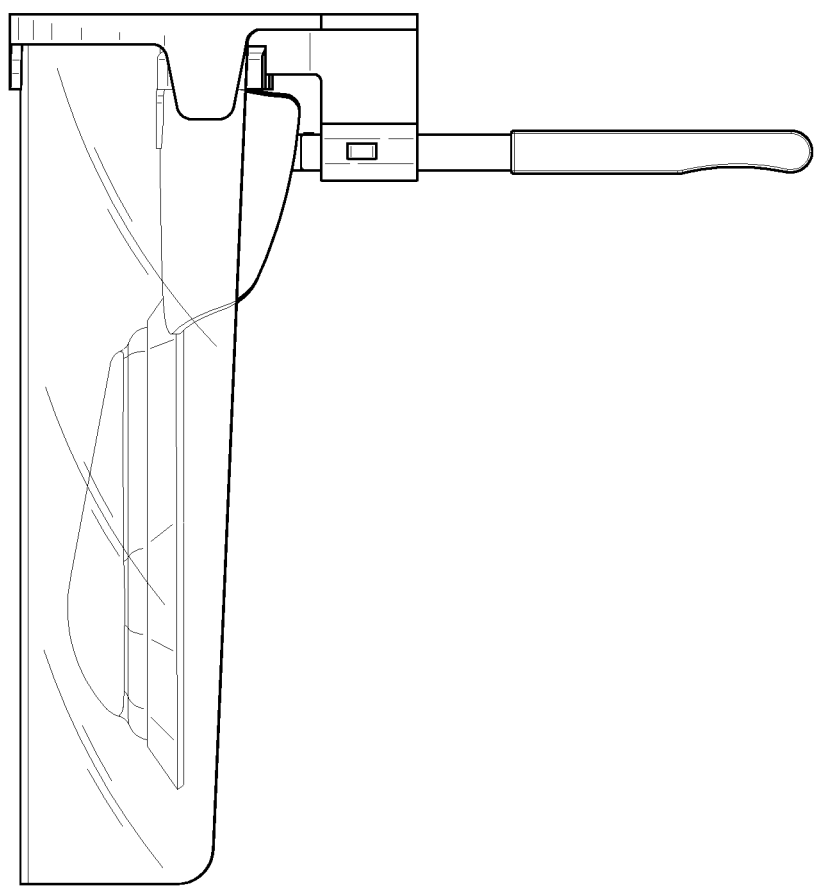
FIG. 20 is a right-side view of the face shield and breathing filter of FIG. 12.
Figure 21:
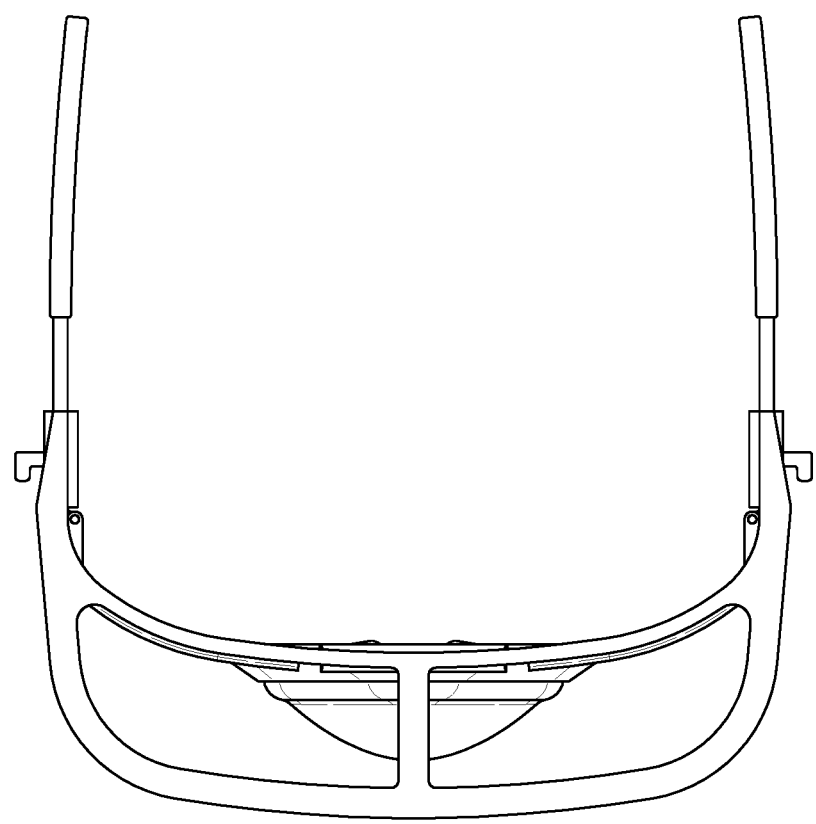
FIG. 21 is a top view of the face shield and breathing filter of FIG. 12.
Figure 22:
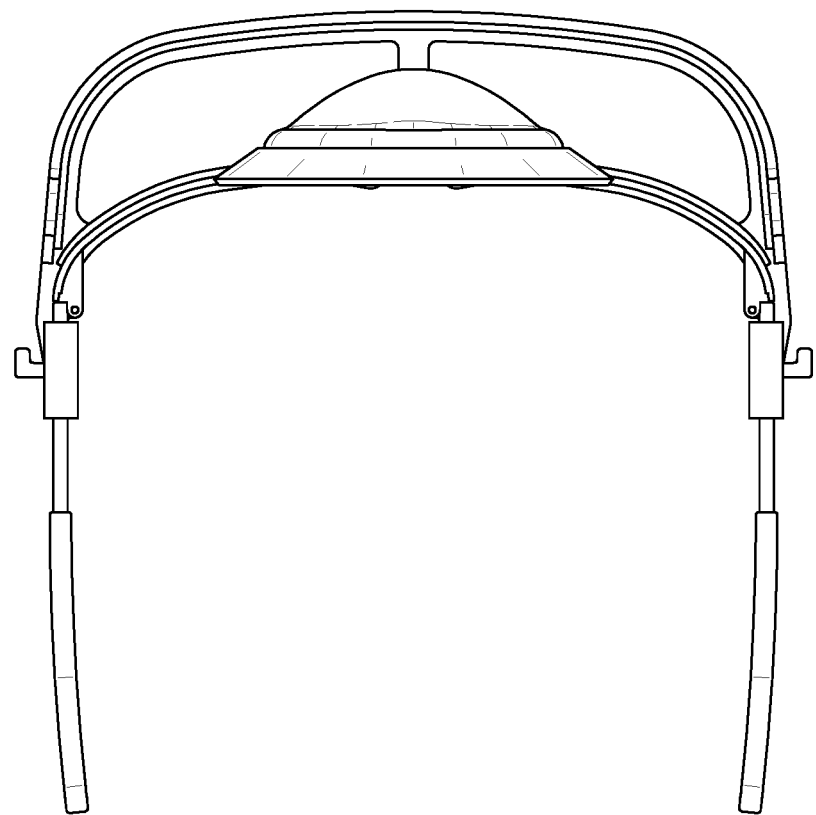
FIG. 22 is a bottom view of the face shield and breathing filter of FIG. 12.

FIG. 1 though FIG. 11 illustrate a face shield 10 in accordance with the present invention. The face shield 10 may comprise a shield portion 12. The shield 12 may be formed from translucent or transparent material, such as but not limited to, polymers. The shield 12 may be curved or straight. The shield 12 may be configured to partially or entirely cover the face of most or all users. Various shape and size shield 12 may be utilized that are configured to cover various portions of a user's face or other body part(s).

The face shield 10 may comprise eyeglasses or goggles 14. Any type of eyeglasses, goggles, or the like may be utilized. The face shield 10 may comprise an attachment portion 16. The attachment portion 16 may be configured to secure the shield 12 to the eyeglasses or goggles 14.

The attachment portion 16 may comprise an outer band 18. The outer band 18 may comprise an arcuate shape, though other shapes, or combinations of shapes, may be utilized. In exemplary embodiments, without limitation, the outer band 18 may be shaped to match the curvature of the shield 12. The outer band 18 may extend along some or all of an upper portion of the shield portion 12. In exemplary embodiments, some or all of the outer band 18 may be secured to the upper edge of the shield 12. In other exemplary embodiments, some or all of the outer band 18 may be spaced apart from the upper edge of the shield 12. In yet other exemplary embodiments, the outer band 18 may be provided part way down the shield 12 such that a portion of the shield 12 extends above the outer band 18.

The attachment portion 16 may comprise an inner band 26. The inner band 26 may comprise an arcuate shape, though other shapes, or combinations of shapes, may be utilized. In exemplary embodiments, without limitation, the inner band 26 may be configured to match the curvature of a wearer's forehead. The inner band 26 may be configured to rest against the forehead or other head portion of the user, though such is not required. The inner band 26 may be spaced apart from the outer band 18 for at least a portion of a length of said inner band 26 and said outer band 18. The inner band 26 may extend along some or all of an upper portion of the eyeglasses or goggles 14. In exemplary embodiments, without limitation, some or all of the inner band 26 may be secured to the upper edge of the eyeglasses or goggles 14. In other exemplary embodiments, without limitation, some or all of the inner band 26 may be spaced apart from the upper edge of the eyeglasses or goggles 14.

The attachment portion 16 may be configured to space the shield 12 from the user's face to prevent fogging, inadvertent contact, or the like.

The outer and inner bands 18 and 26 may be attached to one another at distal portions thereof 28. The distal portions 28 may be configured to provide structural rigidity and/or strength to the attachment portion 16. One or more reinforcement members 24 may extend between the outer band 18 and the inner band 26. In exemplary embodiments, a single reinforcement member 24 may extend from a central portion of said outer band 18 to a central portion of said inner band 26, though multiple reinforcement members 24 at multiple areas may be utilized. A reinforcement area 20 may be provided at a center part of the shield 12, such as but not limited to, at the intersection of the reinforcement member 24 and said outer band 18 and/or said inner band 26. Said reinforcement area 20 may comprise added material filling what would otherwise be a gap between said inner band 26 and said outer band 18. Alternatively, or additionally, the reinforcement area 20 may comprise increased density and/or higher strength material. Other areas of reinforcement may be utilized of various size, shape, type, and/or location.

One or more clips 22 may be secured to the outer band 18 and/or the inner band 26. In exemplary embodiments, without limitations, a clip 22 may be provided at each of the reinforcement areas 28 where the outer and inner bands 18 and 26 meet. The clips 22 may be configured to receive the eyeglasses or goggles 14. For example, without limitation, the clips 22 may each be configured to receive a temple portion of the eyeglasses or goggles 14. In exemplary embodiments, without limitation, the clips 22 may be configured to receive a portion of the eyeglasses or goggles 14 in a press fit, friction fit, snap fit, some combination thereof, or the like arrangement.

The clips 22 may be configured to be selectively secured to, and removed from, the eyeglasses or googles 14. This may assist with sizing the face shield 10 to a number of different types of eyeglasses or goggles 14. This may permit the face shield 10 to be better fitted to each user's preference. This may, alternatively or additionally, permit easy interface of various types of eyeglasses or goggles 14 to incorporate, for example without limitation, sunglasses, tinted lenses, lighted lenses, polarized lenses, prescription lenses, cleaning, maintenance, fitting, comfort, ergonomics, imaging or augmented reality devices, some combination thereof, or the like. In other exemplary embodiments, the clips 22 may be configured to mate with standard eyeglasses or goggles, such as but not limited to, safety glasses or safety goggles.

The attachment portion 16 may be configured to transfer the weight of the shield 12 to the user at least at the bridge and temples of the eyeglasses or goggles 14 to provide a more secure and comfortable fit. Different eyeglasses or goggles 14 may be used to ensure a secure and comfortable fit. This may also permit quick interchange of the eyeglasses or googles 14 or shield 12, for example without imitation, if one is damaged or contaminated.

FIG. 12 through FIG. 22 illustrates the shield 12 with a breathing filter 30. The breathing filter 30 may be attached to, or integrally formed with, the eyeglasses or goggles 14. For example, without limitation, the breathing filter 30 may be attached to, or integrally formed with, a bridge portion 32 of the eyeglasses or goggles 14. The breathing filter 30 may be configured to cover the user's nose and/or mouth when the shield 12 is worn.

In exemplary embodiments, the breathing filter 30 may comprise a perimeter 36. The perimeter 36 may be 3D printed. The perimeter 36 may be pear-shaped, though any shape is contemplated. The perimeter 36 may extend between a bridge portion of the eyeglasses or goggles 14, though such is not required.

The breathing filter 30 may comprise a filtering portion 38. The filtering portion 38 may comprise material configured to filter any size or shape particulate. The breathing filter 30, including but not limited to the filtering portion 38, may be configured to filter, for example without limitation, pathogens (e.g., viruses, bacteria, fungus, etc.), dust, pollen, soot, smoke, liquid droplets, some combination thereof, or the like. In this way, the breathing filter 30 may prevent the inhalation and/or exhalation of such particulate matter. For example, without limitation, the breathing filter 30 may meet particular medical standards such as, but not limited to, N95.

The face shield 10' may comprise a filter attachment portion 34. The filter attachment portion 34 may be configured to attach the breathing filter 30 to the eyeglasses or goggles 14, such as at the bridge 32. The filter attachment portion 34, alternatively or additionally, may be configured to attach the breathing filter 30 to the inner band 26, such as but not limited to, at a central portion thereof located above the bridge 32.

Figure 23:
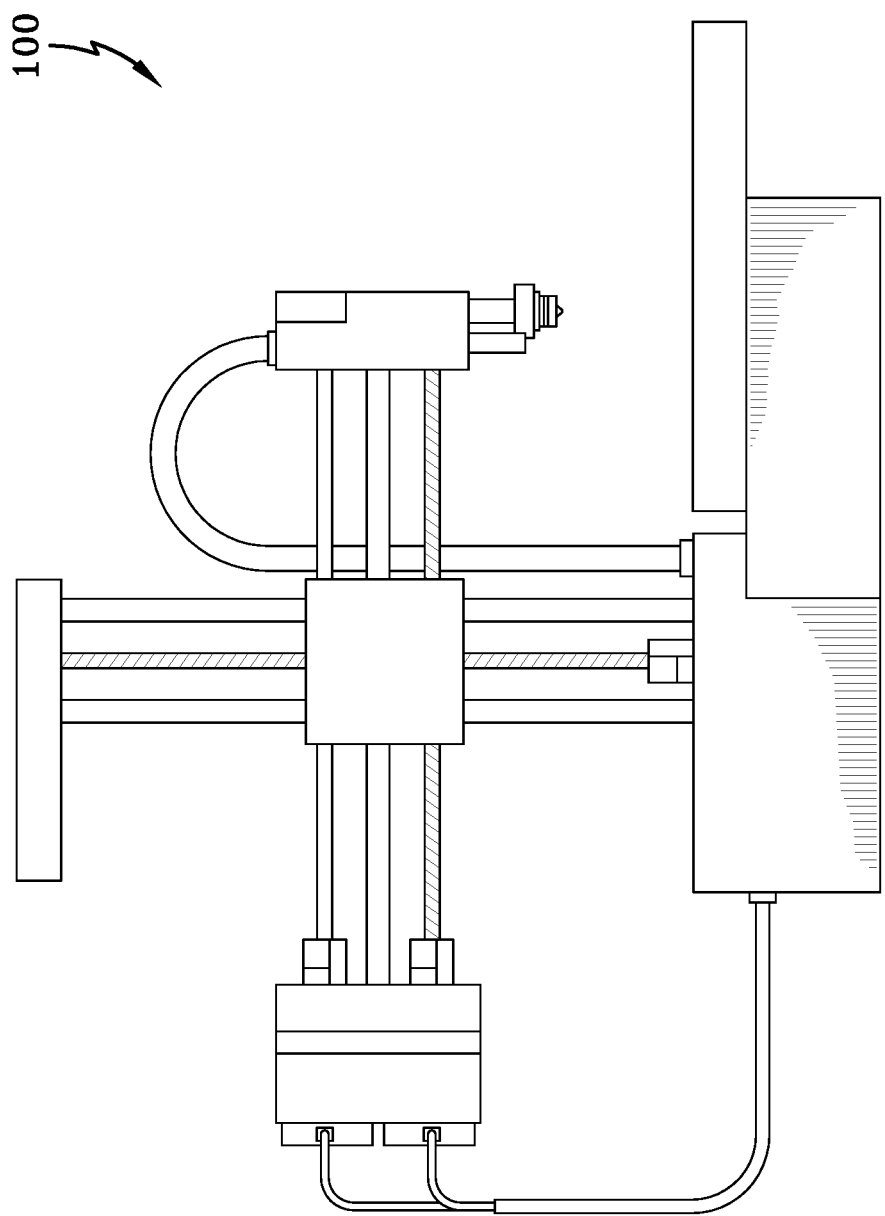
FIG. 23 is a front view of an exemplary 3D printer for creating the face shield of FIGS. 1-22.

FIG. 23 illustrates an exemplary 3D printer 100. While any manufacturing technique may be utilized to produce the face shields 10, 10' in exemplary embodiments, 3D printing may be utilized. The COVID-19 pandemic has brought about a realization that there is a need to quickly and efficiently produce PPE. The utilization of 3D printers would increase the manufacturing capacity for such PPE. 3D printing would also permit non-traditional manufactures, such as but not limited to hospitals and other healthcare providers, to participate in such manufacturing.

The 3D printer 100 may be any type of 3D printer including, but not limited to, stereolithography (SLA), digital light processing (DLP), fused deposition modeling (FDM), selective laser sintering (SLS), selective laser melting (SLM), electronic beam melting (EBM), laminated object manufacturing (LOM), binder jetting (BJ), material jetting (MJ), some combination thereof, or the like.

In exemplary embodiments, the shield 12 may comprise a polymer, such as but not limited to, polycarbonate, polyester, acrylic, polyethylene terephthalate glycol, some combination thereof, of the like. The shield 12 may comprise grains of sand distributed through some or all of the shield 12. The sand grains may add structural rigidity and/or strength to the shield 12. Such sand grains may be deposited during 3D printing, though such is not required.

Alternatively, or additionally, certain portions of the face shield 10, 10' such as, but not limited to, some or all of the attachment portion 16, the perimeter 36, and/or the filter attachment portion 34 may be manufactured by 3D printing. Other portions of the face shield 10, 10' such as, but not limited to, the eyeglasses or goggles 14, the filtering portion 38, and/or the shield 12 may be provided.

Figure 24:
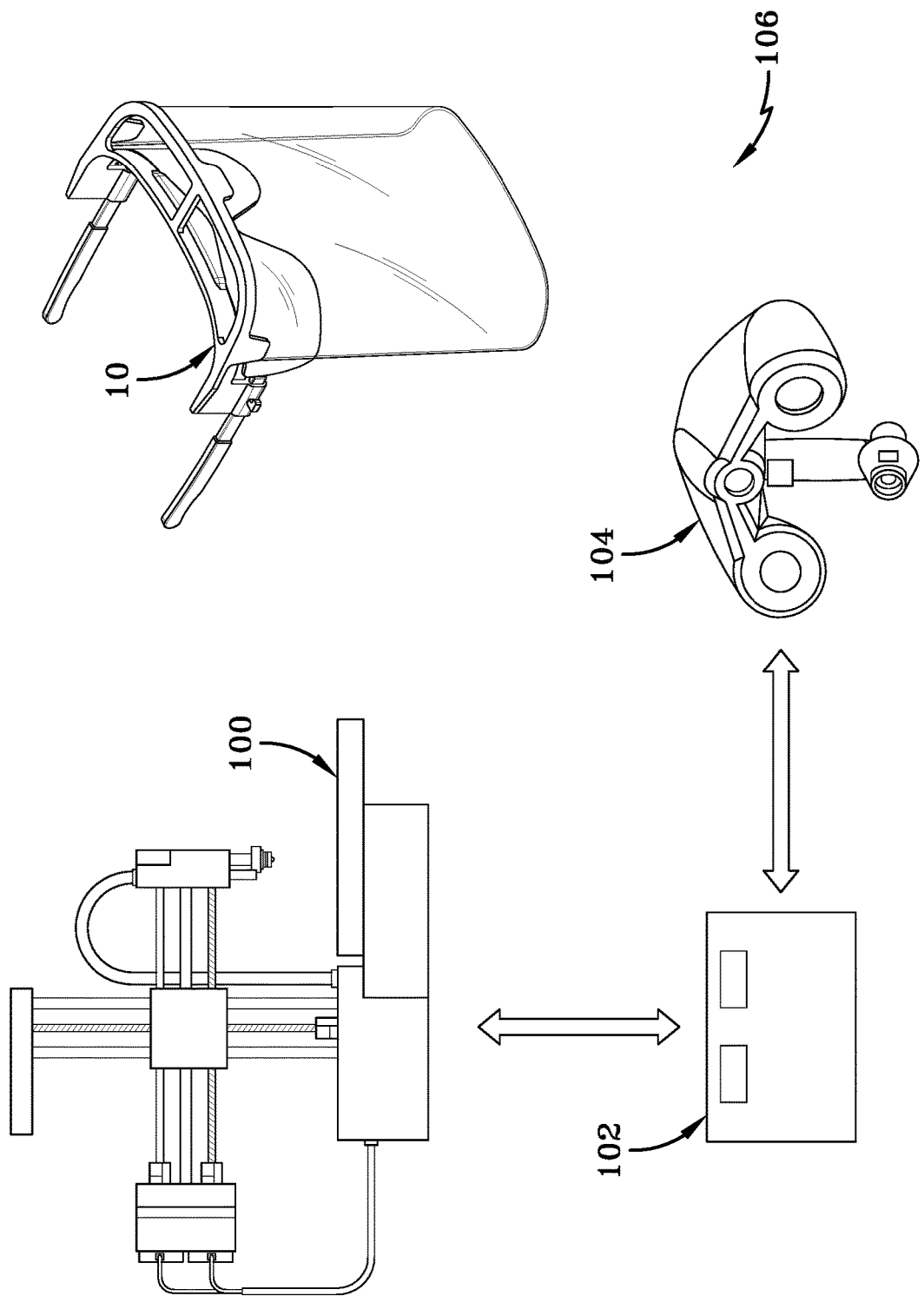
FIG. 24 is a system for generating the face shield of FIGS. 1-22 using the 3D printer of FIG. 23 and in accordance with the present invention.
Figure 25:
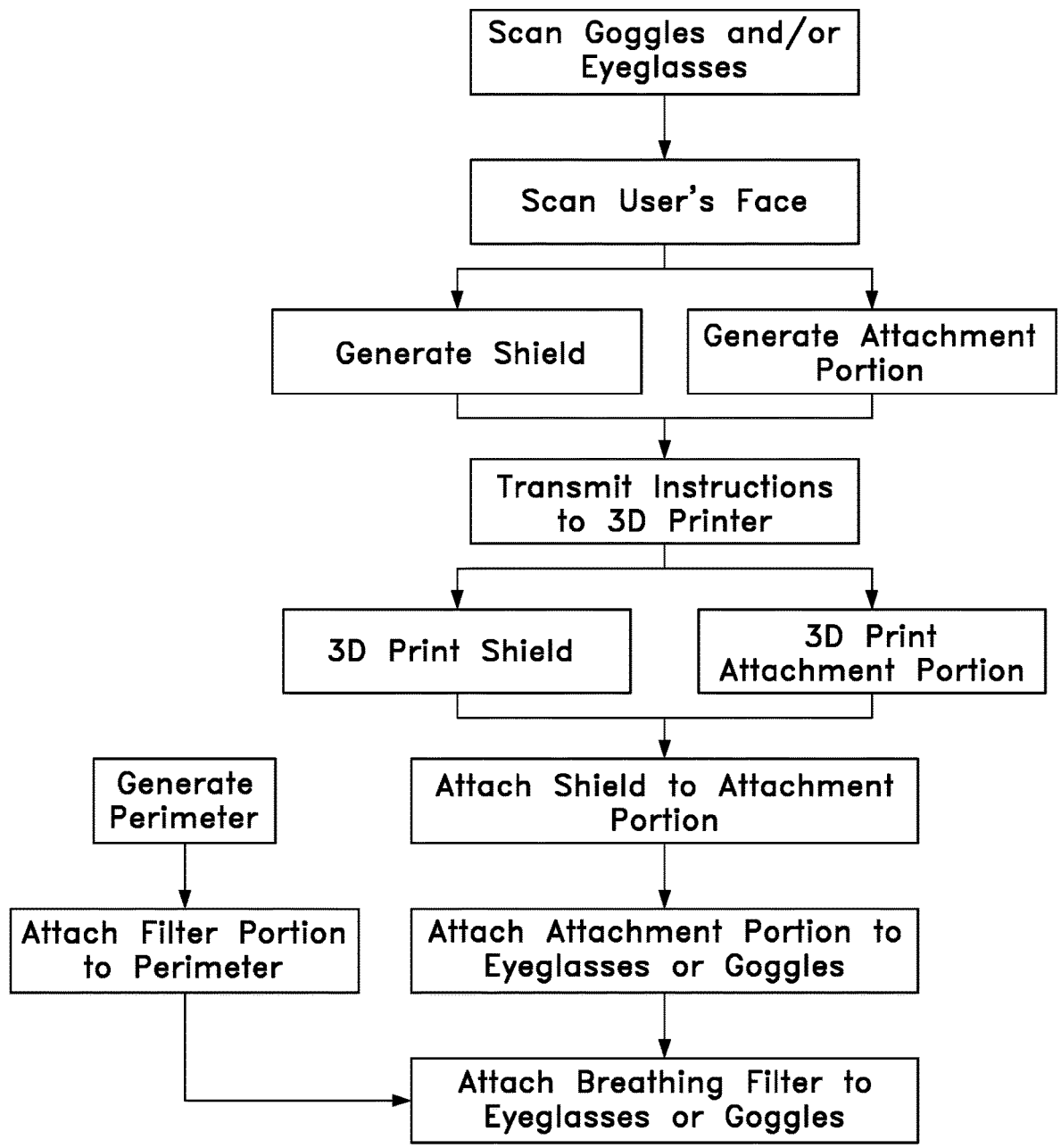
FIG. 25 is a flow chart with exemplary logic for operating the system of FIG. 24.
Figure 26:
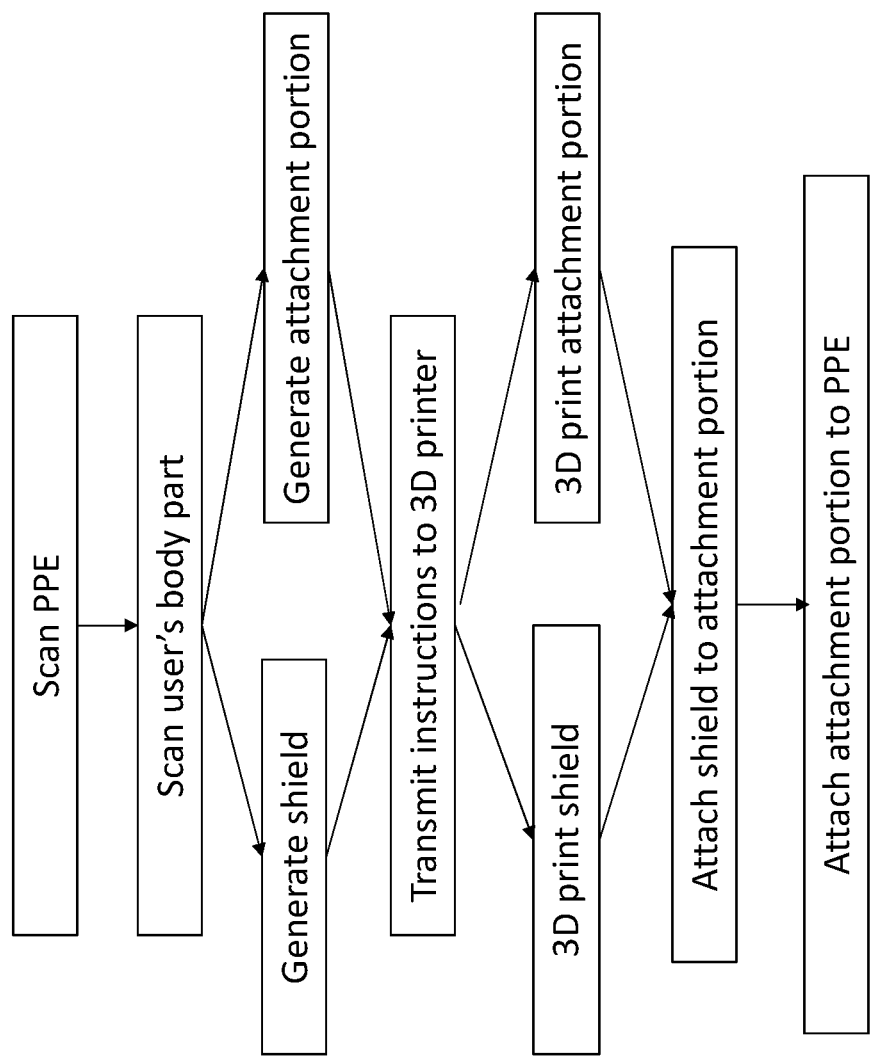
FIG. 26 is a flow chart with other exemplary logic for operating the system of FIG. 24.

FIG. 24 is a system 106 for generating the face shield 10, 10' and FIG. 25 and FIG. 26 are flow charts with exemplary logic for operating the system 106. The system 106 may comprise one or more 3D scanners 104. The 3D scanner 104 may be placed in electronic communication with a controller 102. The controller 102 may be in electronic communication with the 3D printer 100. The controller 102 may be part of and/or in electronic communication with the 3D scanner 104 and/or the 3D printer 100. In exemplary embodiments, the controller 102 may comprise multiple computerized devices at multiple locations.

The 3D scanner 104 may be employed to scan the exterior of the eyeglasses or goggles 14 and generate a modeling data regarding the scanned object. The same or a different 3D scanner 104 may be used to scan the exterior of a user's face to generate modeling data regarding the same. Such modeling data may be stored at the controller 102. The controller 102 may be employed to generate designs of the face shield 10, 10' and/or components thereof. For example, without limitation, the controller 102 may be configured to generate design data for the attachment portion 16 and/or components thereof, including but not limited to, the clip 22. Alternatively, or additionally, the controller 102 may be configured to generate design data for the filter attachment portion 34, the perimeter 36, some combination thereof, or the like. The controller may be configured to generate design data for any number and combination of components for the face shield 10.

The controller 102 may be configured to transmit instructions to the 3D printer 100 to generate the face shield 10, 10' and/or components thereof. For example, without limitation, the eyeglasses or goggles 14, the shield 12, and/or the filtering portion 38 may be separately provided and the 3D printer 100 may be utilized to generate the attachment portion 16, the perimeter 36, and/or the filter attachment portion 34. For example, without limitation, the shield 12 may be cut from sheets of plastic. However, in other exemplary embodiments, the shield 12 may be 3D printed.

The attachment portion 16 may be secured to the shield 12. The attachment portion 16 may be secured to the eyeglasses and/or goggles 14, such as by way of the clips 22. The filtering portion 38 may be secured to the perimeter 36. The breathing filter 30 may be secured to the eyeglasses or goggles 14, such as by way of the filter attachment portion 34.

These disclosures may permit the generation of various attachment portions 16 for securing various size, shape, and types of shields 12 to various sizes, shapes, and types of PPE 14 without the need for tooling.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A face shield comprising:
goggles or eyeglasses configured to be worn by a user;
a shield configured to cover at least a majority of the user's face when said face shield is worn by said user; and
an attachment portion configured to secure said shield portion to said googles or eyeglasses, said attachment portion comprising:
an outer band secured to said shield and extending along an upper portion of said shield;
an inner band extending along an upper portion of said goggles or eyeglasses; and
a first and second clip, each configured to removably receive a respective temple portion of said goggles or eyeglasses to secure said attachment portion to said goggles or eyeglasses; and
a breathing filter configured to cover the nose and mouth of said user when worn, and comprising a bridge portion for removably securing said breathing filter to a central portion of eyeglasses or goggles by snap fitting over the central portion of said eyeglasses or goggles and the bridge portion extending to said inner band.

2. The face shield of claim 1 wherein:
said outer band and said inner band are attached to one another at opposing ends thereof; and
said first clip is located at a first intersection of said outer band and said inner band and said second clip is located at a second intersection of said outer band and said inner band.

3. The face shield of claim 1 further comprising:
a reinforcement member extending between said inner band and said outer band.

4. The face shield of claim 3 further comprising:
a reinforcement area located at a central portion of an upper edge of said shield, wherein said reinforcement member extends from said reinforcement area to a central portion of said inner band.

5. The face shield of claim 1 wherein:
said inner band extends along, and is attached to, an upper edge of said goggles or eyeglasses; and
said outer band extends along, and is attached to, an upper edge of said shield.

6. The face shield of claim 1 wherein:
at least a portion of said inner band is spaced apart from an upper edge of said goggles or eyeglasses; and
at least a portion of said outer band is spaced apart from an upper edge of said shield.

7. The face shield of claim 1 wherein:
said breathing filter comprises:
a pear-shaped perimeter which extends from the bridge portion; and
a filter material extending within the perimeter, wherein the filter material is flexible relative to the perimeter.

8. The face shield of claim 1 wherein:
said attachment portion is formed by 3D printing.

9. The face shield of claim 8 wherein:
said shield is formed by 3D printing and comprises sand particles.

10. The face shield of claim 1 wherein:
the first and second clips are each configured to receive said eyeglasses or goggles in a snap fit.

11. The face shield of claim 1 wherein:
said eyeglasses or goggles consist of eyeglasses.

12. The face shield of claim 1 wherein:
said first and second clips are configured to interchangeably receive a number of different types and sizes of eyeglasses or goggles.

13. A face shield comprising:
a shield formed from a transparent or translucent material, wherein said shield has a curved shape and is configured to cover a user's face when said face shield is worn by said user; and
an attachment portion is secured to said shield and configured for attachment to eyeglasses, said attachment portion comprising:
an outer band having an arcuate shape secured to an upper edge of said shield;
an inner band having an arcuate shape configured to extend along an upper edge of said eyeglasses when said attachment portion is secured to said eyeglasses;
a left reinforcement area where a first end of said outer band intersects a first end of said inner band;
a right reinforcement area where a second end of said outer band intersects a second end of said inner band;
a left clip located at said left reinforcement area, wherein said left clip is configured to removably receive a left temple portion of said eyeglasses; and
a right clip located at said right reinforcement area, wherein said right clip is configured to removably receive a right temple portion of said eyeglasses:
wherein said shield and said attachment portion are formed by binder jetting 3D printing:
wherein at least a central portion of said inner band is secured to a central portion of said eyeglasses;
wherein at least a central portion of said outer band is secured to a central portion of said shield;
at least one reinforcement member extending between a central portion of said outer band and a central portion of said inner band;
a breathing filter comprising:
a perimeter formed by binder jetting 3D printing and extending from a central portion of said inner band, along a bridge of said eyeglasses, and below said eyeglasses, wherein said perimeter is configured to extend about the user's nose and mouth when said face shield is worn by said user; and
a filtering portion extending within said perimeter and configured to filter pathogens: and
a filter attachment portion formed by binder jetting 3D printing and extending from said perimeter, about said bridge, and to a central portion of said inner band.

* * * * *